US010938767B2

(12) United States Patent
Wren et al.

(10) Patent No.: US 10,938,767 B2
(45) Date of Patent: Mar. 2, 2021

(54) OUTPUTTING REENGAGEMENT ALERTS BY A COMPUTING DEVICE

(71) Applicant: Google Inc., Mountain View, CA (US)

(72) Inventors: Christopher Richard Wren, Arlington, MA (US); Allyson E. Tong, San Jose, CA (US); Christophe François Chu, Mountain View, CA (US); Julia Claire Reynolds, Cambridge, MA (US); Justin R. Barber, Menlo Park, CA (US); Madeleine D. Mellor, San Francisco, CA (US); Selim Flavio Cinek, San Francisco, CA (US)

(73) Assignee: Google LLC, Mountain View, CA (US)

( * ) Notice: Subject to any disclaimer, the term of this patent is extended or adjusted under 35 U.S.C. 154(b) by 249 days.

(21) Appl. No.: 15/458,338

(22) Filed: Mar. 14, 2017

(65) Prior Publication Data

US 2018/0270179 A1 Sep. 20, 2018

(51) Int. Cl.
| | | |
|---|---|---|
| *G06F 15/16* | (2006.01) | |
| *H04L 12/58* | (2006.01) | |
| *H04L 29/08* | (2006.01) | |
| *G06Q 30/02* | (2012.01) | |
| *G06Q 10/10* | (2012.01) | |

(52) U.S. Cl.
CPC ......... *H04L 51/24* (2013.01); *G06Q 10/109* (2013.01); *G06Q 30/0207* (2013.01); *G06Q 30/0251* (2013.01); *G06Q 30/0261* (2013.01); *G06Q 30/0267* (2013.01); *H04L 67/26* (2013.01)

(58) Field of Classification Search
CPC ....... H04L 51/24; H04L 67/26; G06Q 10/109; G06Q 30/0207; G06Q 30/0251; G06Q 30/0261; G06Q 30/0267
See application file for complete search history.

(56) References Cited

U.S. PATENT DOCUMENTS

| | | | |
|---|---|---|---|
| 8,712,383 B1 * | 4/2014 | Hayes ................... | H04L 67/125 455/412.2 |
| 8,948,821 B2 | 2/2015 | Newham et al. | |
| 2006/0116142 A1 * | 6/2006 | Cofta ..................... | H04L 51/24 455/466 |
| 2009/0286524 A1 * | 11/2009 | Guedalia ........... | H04M 1/72522 455/418 |
| 2013/0316744 A1 | 11/2013 | Newham et al. | |

(Continued)

OTHER PUBLICATIONS

International Search Report and Written Opinion of International Application No. PCT/US2017/059344, dated Feb. 28, 2018, 13 pp.

(Continued)

*Primary Examiner* — Dustin Nguyen
*Assistant Examiner* — Hao H Nguyen
(74) *Attorney, Agent, or Firm* — Shumaker & Sieffert, P.A.

(57) ABSTRACT

In general, techniques of this disclosure may enable a computing device to defer output of a reengagement type notification until the computing device determines that a user is likely to engage with the application or service that generated the notification, as opposed to ignoring or dismissing the notification and/or the application or service. In this way, by precisely controlling its output, the described techniques may enable a computing device to increase a likelihood that a reengagement notification will succeed in reengaging a user with the application or service associated with the notification.

15 Claims, 6 Drawing Sheets

(56) References Cited

U.S. PATENT DOCUMENTS

| | | | |
|---|---|---|---|
| 2013/0346408 A1 | 12/2013 | Duarte et al. | |
| 2014/0118272 A1* | 5/2014 | Gunn | G06F 1/3265 345/173 |
| 2014/0129661 A1* | 5/2014 | Thyagaraja | G06F 9/542 709/207 |
| 2014/0197946 A1* | 7/2014 | Park | G08B 5/22 340/539.11 |
| 2014/0206328 A1* | 7/2014 | Varoglu | G06Q 10/109 455/418 |
| 2014/0257747 A1* | 9/2014 | Repenning | H04W 4/022 702/150 |
| 2015/0194165 A1* | 7/2015 | Faaborg | G01C 21/3629 704/270.1 |
| 2015/0200899 A1 | 7/2015 | Sanketi | |
| 2015/0269009 A1* | 9/2015 | Faaborg | A61B 5/6898 719/315 |
| 2015/0371516 A1* | 12/2015 | Petersen | A61B 5/746 340/539.12 |
| 2016/0062464 A1* | 3/2016 | Moussette | H04L 51/24 345/173 |
| 2016/0117344 A1* | 4/2016 | Kleinpeter | G06F 16/1748 707/692 |
| 2017/0359439 A1* | 12/2017 | Beach | G06Q 10/10 |
| 2018/0063670 A1* | 3/2018 | Garg | H04W 4/60 |
| 2018/0097932 A1* | 4/2018 | Cohen | H04M 3/42051 |

OTHER PUBLICATIONS

Response to Written Opinion dated Feb. 28, 2018, from international application No. PCT/US2017/059344, filed Jul. 12, 2018, 20 pp.

Second Written Opinion of International Application No. PCT/US2017/059344, dated Sep. 12, 2018, 6 pp.

International Preliminary Report on Patentability from International Application No. PCT/US2017/059344, dated Feb. 7, 2019, 7 pp.

Response to Communication Pursuant to Rules 161(1) and 162 EPC dated Dec. 2, 2019 from counterpart European Application No. 17808219.4, 5 pp.

* cited by examiner

OUTPUTTING REENGAGEMENT ALERTS BY A COMPUTING DEVICE

BACKGROUND

A computing device may output a notification alert indicative of the receipt of new notification data each time that new notification data is received. For example, a computing device may output an audible, visual, or haptic type alert each time the device receives a new communication or other type of notification data. One type of notification data a computing device may output is reengagement type notification data, more specifically, notification data generated by an application or service for the purpose of enticing a user to interact with the application or service, after a period of inactivity with the application or service.

SUMMARY

In general, techniques of this disclosure may enable a computing device to defer output of a notification to a user based on various considerations. For example, output of a reengagement type notification may be deferred until the computing device determines that a user is likely to engage with the application or service that generated the notification, as opposed to ignoring or dismissing the notification and/or the application or service. In this way, by precisely controlling its output, the described techniques may enable a computing device to increase a likelihood that a reengagement notification will succeed in reengaging a user with the application or service associated with the notification. Consequently, the resources of the computing device and user interface may be used more efficiently and the computing device may become a more useful and effective tool for the user.

More specifically, a computing device may determine whether or not to suppress the output of an alert (e.g., an audible alert, a visual alert, or a tactile alert) associated with a notification or reengagement type notification data in various ways, such as based on an assigned reengagement score associated with the notification data and a reengagement score threshold. The computing device may determine the reengagement score threshold based on contextual information indicative of whether a user is likely to engage with the notification data at a first time.

The reengagement score threshold represents the minimum reengagement score that a reengagement type notification needs to have for a current context, before the computing device will output an alert based on the notification, in the current context. In a current context, the computing device may establish a higher reengagement score threshold to allow fewer alerts associated with reengagement type notifications from being output in the current context and may establish a lower reengagement score threshold to enable more alerts associated with reengagement type notifications to be output, in the current context.

If the computing device determines that the notification data is reengagement type notification data and the computing device has received explicit consent from the user to gather contextual information associated with the computing device, the computing device may dynamically determine a reengagement score threshold based on the gathered contextual information that may be indicative of a user's current activity or location. If the computing device determines that the user is likely to engage with the notification data given the gathered contextual information, the computing device may output a notification alert associated with the notification data. Conversely, if the computing device determines that the user is not likely to engage with the notification data, the computing device may suppress the output of the notification alert.

In this manner, the computing device may alert a user of the computing device of the receipt of reengagement type notification data at a time that the user is more likely to actually interact with the alert. Further, at times where interacting with the notification alert may be inappropriate or when the user is not likely to interact with the notification alert at all, the computing device may refrain from outputting notification alerts which would only be overwhelming or annoying to the user of the computing device. By selectively outputting alerts based on the reengagement score and the reengagement score threshold, the computing device may ultimately output fewer alerts by only outputting alerts that are likely to be interacted with rather than merely outputting alerts immediately upon receipt of the associated notification data. Responsive to outputting fewer alerts, the computing device may receive fewer inputs from a user interacting with the computing device (e.g., to silence or otherwise inhibit ineffective alerts) and may perform fewer operations (e.g., the output of the audio or visual alert or the vibration of the computing device), thereby consuming less electrical power.

In one example, the disclosure is directed to a method that includes determining whether notification data received by a computing device is reengagement type notification data. The method further includes, if the notification data is not reengagement type notification data, outputting a notification alert associated with the notification data. Otherwise, if the notification data is reengagement type notification data, the method further includes determining, based at least in part on contextual information that is indicative of whether a user of the computing device is likely to engage with reengagement type notification data at a first time, a reengagement score threshold for the first time, determining, based at least in part on the notification data, a reengagement score associated with the notification data for the first time, and determining whether the reengagement score satisfies the reengagement score threshold for the first time. If the reengagement score satisfies the reengagement score threshold for the first time, the method further includes outputting, at or after the first time, the notification alert associated with the notification data. If the reengagement score does not satisfy the reengagement score threshold for the first time, the method further includes suppressing, at or after the first time, output of the notification alert associated with the notification data.

In another example, the disclosure is directed to a computing device that includes at least one processor and a memory that stores instructions that, when executed, cause the at least one processor to determine whether notification data received by the computing device is reengagement type notification data. The instructions further cause the at least one processor to, if the notification data is not reengagement type notification data, output a notification alert associated with the notification data. If the notification data is reengagement type notification data, the instructions further cause the at least one processor to determine, based at least in part on contextual information that is indicative of whether a user of the computing device is likely to engage with reengagement type notification data at a first time, a reengagement score threshold for the first time, determine, based at least in part on the notification data, a reengagement score associated with the notification data for the first time, and determine whether the reengagement score satisfies the reengagement score threshold for the first time. If the reengagement score satisfies the reengagement score threshold for the first time, the instructions further cause the at least one processor to output, at or after the first time, the notification alert associated with the notification data. If the reengagement score does not satisfy the reengagement score threshold for the first time, the instructions further cause the at least one processor to suppress, at or after the first time, output of the notification alert associated with the notification data.

In another example, the disclosure is directed to a non-transitory computer-readable storage medium storing instructions that, when executed, cause at least one processor of a computing device to determine whether notification data received by the computing device is reengagement type notification data. The instructions further cause the at least one processor to, if the notification data is not reengagement type notification data, output a notification alert associated with the notification data. If the notification data is reengagement type notification data, the instructions further cause the at least one processor to determine, based at least in part on contextual information that is indicative of whether a user of the computing device is likely to engage with reengagement type notification data at a first time, a reengagement score threshold for the first time, determine, based at least in part on the notification data, a reengagement score associated with the notification data for the first time, and determine whether the reengagement score satisfies the reengagement score threshold for the first time. If the reengagement score satisfies the reengagement score threshold for the first time, the instructions further cause the at least one processor to output, at or after the first time, the notification alert associated with the notification data. If the reengagement score does not satisfy the reengagement score threshold for the first time, the instructions further cause the at least one processor to suppress, at or after the first time, output of the notification alert associated with the notification data.

In another example, the disclosure is directed to a system comprising means for determining whether notification data received by the computing device is reengagement type notification data. The system further comprises, if the notification data is not reengagement type notification data, means for outputting a notification alert associated with the notification data. Otherwise, if the notification data is reengagement type notification data, the system further comprises means for determining, based at least in part on contextual information that is indicative of whether a user of the computing device is likely to engage with reengagement type notification data at a first time, a reengagement score threshold for the first time, means for determining, based at least in part on the notification data, a reengagement score associated with the notification data for the first time, and means for determining whether the reengagement score satisfies the reengagement score threshold for the first time. If the reengagement score satisfies the reengagement score threshold for the first time, the system further comprises means for outputting, at or after the first time, the notification alert associated with the notification data. If the reengagement score does not satisfy the reengagement score threshold for the first time, the system further comprises means for suppressing, at or after the first time, output of the notification alert associated with the notification data.

In another example, the disclosure is directed to a method comprising executing, by an operating system of a computing device, a plurality of user applications. The method further comprises receiving, by a notification service of the computing device and from the user applications, notifications for presentation to a user of the device. The method further comprises presenting, by the notification service of the computing device, at least some of those notifications to the user. The method also comprises automatically deciding, by a notification deferral element of the notification service of the computing device, whether to present the notification to the user immediately or to defer presentation of the notification for a period of time.

In another example, the disclosure is directed to a personal computing device comprising an operating system arranged to execute a plurality of user applications. The personal computing device further comprises a notification service arranged to receive, from the user applications, notifications for presentation to a user of the device, and to present at least some of those notifications to the user. The notification service further comprises a notification deferral element arranged to automatically decide whether to present the notification to the user immediately or to defer presentation of the notification for a period of time.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
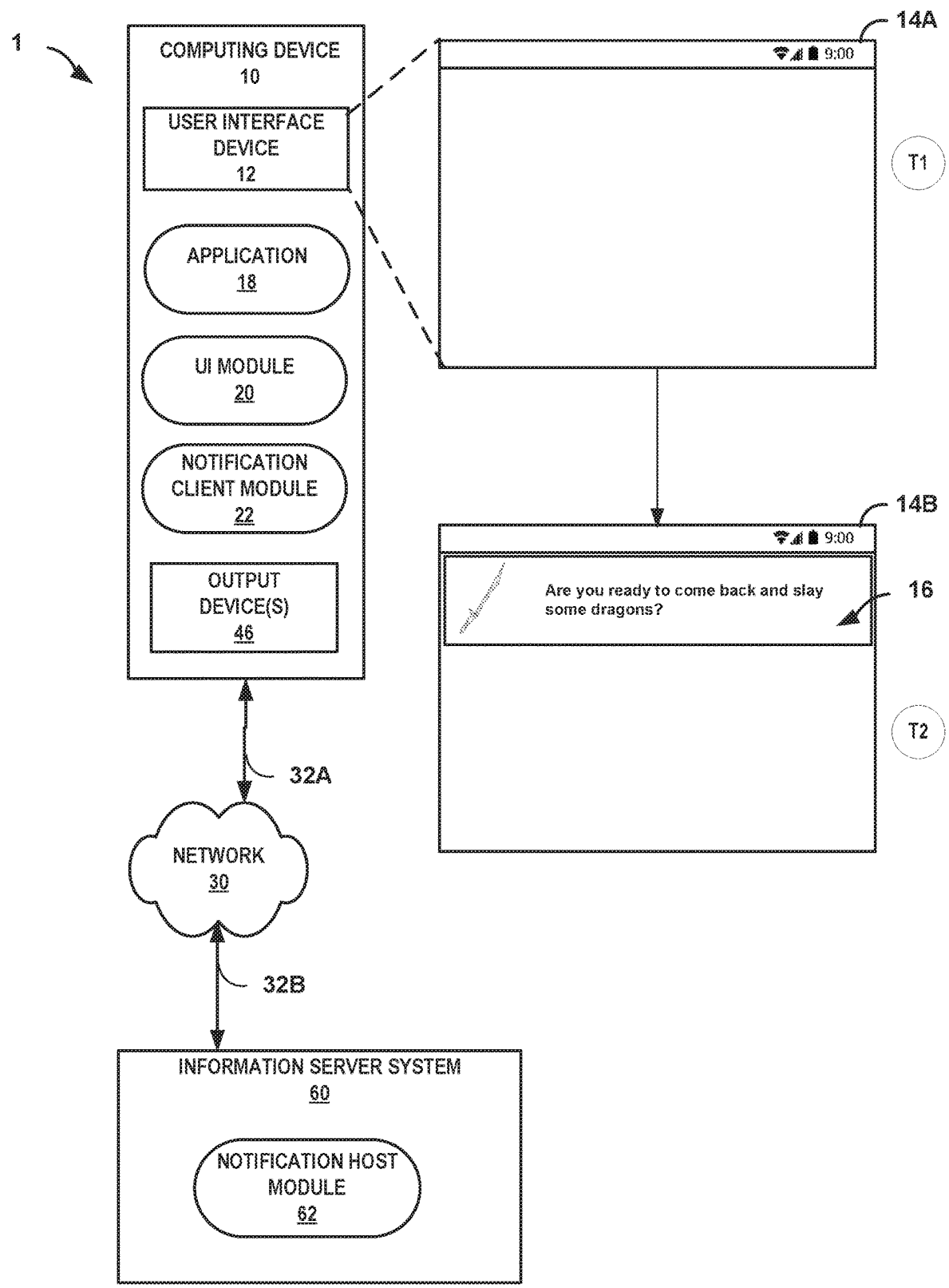
FIG. 1 is a conceptual diagram illustrating an example computing system configured to selectively output alerts associated with reengagement notification data, in accordance with one or more aspects of the present disclosure.

FIG. 1 is a conceptual diagram illustrating an example computing system 1 that is configured to output alerts associated with reengagement notification data based at least in part on a reengagement score and a reengagement score threshold with an example computing device 10, in accordance with one or more aspects of the present disclosure. Computing system 1 of FIG. 1 is an example computing system that includes computing device 10, information server system 60, and network 30.

Network 30 represents any public or private communication network, for instance, a cellular, Wi-Fi, and/or other type of network for transmitting data between computing devices. Computing device 10 and information server system 60 may send and receive data across network 30 using any suitable communication techniques. For example, computing device 10 may be operatively coupled to network 30 using network link 32A. Information server system 60 may be operatively coupled to network 30 by network link 32B. Network 30 may include network hubs, network switches, network routers, etc., that are operatively inter-coupled thereby providing for the exchange of information between computing device 10 and information server system 60. In some examples, network links 32A and 32B may be Ethernet, ATM or other network connections. Such connections may be wireless and/or wired connections.

Information server system 60 represents any suitable remote computing system, such as one or more desktop computers, laptop computers, mobile phones, tablet computers, mainframes, servers, cloud computing systems, etc. capable of sending and receiving information across network link 32B to network 30. In some examples, information server system represents a host server for a notification system service. One or more computing devices, such as computing device 10, may access a notification service hosted by information server system 60 for transmitting and/or receiving notification data between platforms, applications, and services executing at the one or more computing devices. In some examples, information server system 60 represents a cloud computing system that provides notification services through network 30 to one or more computing devices, such as computing device 10, that access the notification services via access to the cloud provided by information server system 60. For example, information server system 60 may be a mobile phone and computing device 10 may be a smart watch device operably connected to information server system 60. The mobile phone (i.e., information server system 60) may receive notification data from an outside server or network. Upon receiving the notification data, the mobile phone may forward the notification data to the smart watch device (i.e., computing device 10) via network 30, which may be a short-link radio connection for the purposes of this example.

In the example of FIG. 1, information server system 60 includes notification host module 62. Notification host module 62 may perform operations described using software, hardware, firmware, or a mixture of hardware, software, and firmware residing in and/or executing at information server system 60. Information server system 60 may execute notification host module 62 with multiple processors or multiple devices. Information server system 60 may execute notification host module 62 as a virtual machine executing on underlying hardware. Notification host module 62 may execute as a service of an operating system or computing platform. Notification host module 62 may execute as one or more executable programs at an application layer of a computing platform.

Notification host module 62 may perform functions for routing notification data between one or more computing devices, such as computing device 10, over network 30. For example, notification host module 62 may perform functions for hosting a notification service and outputting notification data associated with platforms, applications, and/or services executing at computing device 10. For example, notification host module 62 may receive notification data indicative of an event associated with an e-mail message account (e.g., a new message received) associated with computing device 10 and send the notification data across network 30 to computing device 10. Computing device 10 may receive the notification data from notification host module 62 of information server system 60 via network link 32B and provide an alert at computing device 10 to indicate the receipt of the notification data.

In the example of FIG. 1, computing device 10 is a mobile computing device (e.g., a mobile phone). However, in other examples, computing device 10 may be a tablet computer, a personal digital assistant (PDA), a laptop computer, a gaming system, a media player, an e-book reader, a television platform, an automobile navigation system, a wearable computing device (e.g., a computerized watch, computerized eyewear, a computerized glove), or any other type of mobile or non-mobile computing device.

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 12 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to a user of computing device 10.

UID 12 of computing device 10 may include a presence-sensitive display that may receive tactile input from a user of computing device 10. UID 12 may receive indications of the tactile input by detecting one or more gestures from a user of computing device 10 (e.g., the user touching or pointing to one or more locations of UID 12 with a finger or a stylus pen). UID 12 may present output to a user, for instance at a presence-sensitive display. UID 12 may present the output as a graphical user interface (e.g., user interface 14), which may be associated with functionality provided by computing device 10. For example, UID 12 may present various user interfaces of components of a computing platform, operating system, applications, or services executing at or accessible by computing device 10 (e.g., an electronic message application, an Internet browser application, a mobile operating system, etc.). A user may interact with a respective user interface to cause computing device 10 to perform operations relating to a function.

Computing device 10 may include one or more output devices 46 of computing device 10 may generate output. Examples of output are tactile, audible, and visual output. Output devices 46 of computing device 10, in one example, includes a presence-sensitive display, sound card, video graphics adapter card, speaker, cathode ray tube (CRT) monitor, liquid crystal display (LCD), or any other type of device for generating output to a human or machine.

Computing device 10 may include application 18, user interface ("UP") module 20, and notification client module 22. Modules 20 and 22 and application 18 may perform operations described using software, hardware, firmware, or a mixture of hardware, software, and firmware residing in and/or executing at computing device 10. Computing device 10 may execute modules 20 and 22 and application 18 with one or more processors. Computing device 10 may execute modules 20 and 22 and application 18 as a virtual machine executing on underlying hardware. Modules 20 and 22 and application 18 may execute as a service or component of an operating system or computing platform. Modules 20 and 22 and application 18 may execute as one or more executable programs at an application layer of a computing platform. UID 12 and modules 20 and 22 and application 18 may be otherwise arranged remotely to and remotely accessible to computing device 10, for instance, as one or more network services operating at network 30 in a network cloud. In other words, application 18 may not be executing at computing device 10. Instead, application 18 may be executing at a remote computing system (e.g., a server) and a user interface associated with application 18 may be displayed at computing device 10 and from which a user of computing device 10 may access a cloud-service provided by application 18.

Notification client module 22 may perform functions associated with receiving, managing, and otherwise handling at least a portion of the notification data generated and/or received by platforms, applications, and services executing at computing device 10. Notification client module 22 may cause UI module 20 to output an alert (e.g., an audible alert, a visual alert, a vibration, etc.) to indicate the receipt of the notification data by computing device 10. Notification client module 22 may receive notification data from information server system 60 and output the received notification data to a recipient platform, application, and/or service executing at computing device 10. Notification client module 22 may receive notification data generated by a platform, application, and/or service executing at computing device 10 and output the received notification data to information server system 60. Notification client module 22 may further receive notification data generated by one component of a platform, application, and/or service executing at computing device 10 and output the received notification data to a different component of a platform, application, and/or service executing at computing device 10.

As used throughout the disclosure, the term "notification data" is used to describe various types of information that may indicate either the occurrence of an event associated with various platforms, applications, and services executing within an execution environment at one or more computing devices, such as computing device 10, or an attempt by the respective platform, application, or service to get a user of computing device 10 to interact with the respective platform, application, or service executing on computing device 10 after a period of inactivity. For example, informational type notification data may include, but is not limited to, information specifying an event such as: the receipt of a communication message (e.g., e-mail, instant message, SMS, etc.) by a messaging account associated with a computing device, the receipt of information by a social networking account associated with computing device 10, a reminder of a calendar event (meetings, appointments, etc.) associated with a calendar account of computing device 10, information generated and/or received by a third-party application executing at computing device 10, the transmittal and/or receipt of inter-component communications between two or more components of platforms, applications, and/or services executing at computing device 10, etc. Further, reengagement type notification data may include any notification that does not represent a change in a state of the application, but rather notification data issued for the purpose of reengagement after some period of inactivity with the application.

Notification client module 22 may handle notification data as computing device 10 receives the notification data from information server system 60. For instance, computing device 10 may include a notification queue for processing notification data. Notification client module 22 may place the received notification data into the notification queue. Notification client module 22 may further analyze the notification data in the notification queue and determine whether to output alerts associated with the received notification data and/or at what level of suppression at which to output alerts associated with the received notification data.

UI module 20 may cause UID 12 to output user interfaces 14A and 14B or another example user interface, for display and, as a user of computing device 10 interacts with user interface presented at UID 12, UI module 20 may interpret inputs detected at UID 12 (e.g., as a user provides one or more gestures at a location of UID 12 at which user interface 14 or another example user interface is displayed). UI module 20 may relay information about the inputs detected at UID 12 to one or more associated platforms, operating systems, applications, and/or services executing at computing device 10 to cause computing device 10 to perform a function.

UI module 20 may receive information and instructions from one or more associated platforms, operating systems, applications, and/or services executing at computing device 10 (e.g., notification client module 22) for generating user interfaces 14A and 14B (collectively, user interface 14). In addition, UI module 20 may act as an intermediary between the one or more associated platforms, operating systems, applications, and/or services executing at computing device 10 and various output devices of computing device 10 (e.g., speakers, LED indicators, vibrators, etc.) to produce output (e.g., graphical, audible, hepatic, etc.) with computing device 10.

For instance, user interface 14B is one example graphical user interface for presenting one or more graphical indications of notification data received by computing device 10. User interface 14B includes graphical indication 16. Graphical indication 16 corresponds to an alert being outputted by computing device 10 in response to notification data received at computing device 10. In the example of FIG. 1, graphical indications 16 represents visual alert indicative of the receipt of reengagement notification data associated with a game application 18 executing on computing device 10.

Notification client module 22 may ultimately control when and how (e.g., in what form) notification alerts are output to a user. UI module 20 may receive, as input from notification client module 22, graphical information (e.g., text data, images data, etc.) based on the notification data that notification client module 22 receives. Additionally, UI module 20 may receive instructions associated with the graphical information from notification client module 22 for presenting the graphical information as graphical indication 16 within user interface 14B. Based on the graphical information and the instructions received from notification client module 22, UI module 20 may cause UID 12 to present graphical indications 16 within user interface 14 to alert a user of computing device 10 of the receipt of notification data associated with each of graphical indications 16. In addition, UI module 20 may cause output devices 46 to output an audible, visual, haptic, or other type of alert notifying the user to the receipt of the notification data.

In accordance with techniques of this disclosure, notification client module 22 of computing device 10 may receive notification data from application 18 as application 18 executes at computing device 10. In the example of FIG. 1, application 18 may be a game application, and the notification data may be reengagement type notification data with information, that when presented to the user, is an attempt by developers of application 18 to convince the user to interact with application 18 on computing device 10. In other examples, the notification data may be informational type notification data associated with application 18, such as an indication that a time-based event within application 18 has expired or that a particular action is complete.

Notification client module 22 may determine whether notification data received by computing device 10 is reengagement type notification data. In some examples, the notification data may include metadata indicating whether the notification data is reengagement type notification data or informational type notification data. In other instances, application 18 may generate an extra indication (e.g., supplemental data) that defines the type of the notification data as being reengagement type notification data as opposed to some other type of notification data. In some other instances, notification client module 22 may analyze the contents of the notification data itself received from application 18 to determine whether the notification data is reengagement type notification data. For example, notification client module 22 may analyze text or other content of the notification data and determine whether the text or other content indicates that the notification data is reengagement type notification data or informational type notification data, adjusting the analysis over time based on correct and incorrect readings.

If notification client module 22 determines that the notification data is not reengagement type notification data (e.g., informational type notification data), UI module 20 may output, at a first time, a notification alert associated with the notification data. As non-reengagement type notification data may be more important or contain more time-sensitive material than reengagement type notification data, UI module 20 may output the notification alert associated with the non-reengagement type notification data upon receipt of the notification data.

If, however, notification client module 22 determines that the notification data is reengagement type notification data, notification client module 22 may determine, based at least in part on contextual information that is indicative of whether a user of computing device 10 is likely to engage with reengagement type notification data at time T1, a reengagement score threshold for time T1. Prior to collecting contextual information, computing device 10 may prompt a user of computing device 10 for explicit consent to collect the contextual information.

The contextual information may include one or more of a current level of user interaction with computing device 10 (e.g., whether the user is currently interacting with computing device 10, how often the user is inputting commands into computing device 10, etc.), a type of current user interaction with computing device 10 (e.g., what application the user is interacting with on computing device 10, how often the user is switching between applications on computing device 10, etc.), a current ambient noise level (e.g., an ambient noise volume), a current ambient noise type (e.g., is the ambient noise indicative of the user participating in a particular activity or being in a particular setting, etc.), a current location of the computing device (e.g., a home location, an office location, a moving vehicle, an outdoor location, etc.), calendar data stored on the computing device (e.g., is the user in a meeting or are they available), or a first time (e.g., is the time indicative of the user being in a particular setting), among other things. For example, prior to retaining contextual information associated with the user of computing device 10, UI module 20 may present a user interface via UI device 12 that requests a user to select a box, click a button, state a voice input, or otherwise provide a specific input to the user interface that is interpreted by computing device 10 as unambiguous, affirmative consent for application extension 23 to collect and make use of the user's personal information and the contextual information. At this point, computing device 10 may continue to execute the remainder of the techniques described herein. For instance, after computing device 10 receives user input indicating that the user consents to the collection of the contextual information about the user and device information describing computing device 10 or a surrounding environment of computing device 10, computing device 10 may proceed to collect said contextual information.

Using this contextual information, notification client module 22 may determine a reengagement score threshold indicative of whether a user of computing device 10 is likely to engage with reengagement type notification data, in general, at time T1. Notification client module 22 may use a set of conversion rules or various machine learning techniques, described in detail with respect to FIG. 2, to convert the gathered contextual information into a reengagement score threshold that defines a minimum reengagement score that reengagement type notification data, in general, is predicted to need in order to get the user of computing device 10 to engage with the notification data, for a current context.

In the example of FIG. 1, at time T1, computing device 10 may be located at the user's place of business, and the calendar data may indicate that the user is currently in a meeting. As such, notification client module 22 may determine the reengagement score threshold to be high, indicating that the user may be busy and, therefore, unlikely to be able to engage or unlikely to be interested in engaging with reengagement type notifications, in general, at the first time. In other words, by setting a high reengagement score threshold, notification client module 22 is determining that notification client module 22 is unlikely to output reengagement type notifications unless the reengagement type notifications have particular characteristics, as the user is unlikely to interact with such notification data and application 18. Conversely, if notification client module 22 converts the contextual information into a lower threshold, notification client module 22 is more likely to output reengagement type notifications, as the user may be more likely to be able to engage or more likely to be interested in engaging with reengagement type notifications.

Notification client module 22 may further determine, based at least in part on the notification data, a reengagement score associated with the notification data for time T1. Notification client module 22 may use a set of conversion rules or various machine learning techniques, described in detail with respect to FIG. 2, to convert information about the notification data, such as lifespan information of the notification data, usage information for application 18, a reengagement score model, and/or a crowdsources reengagement score model, into a reengagement score. For instance, time T1 may be very close in time to when notification client module 22 received the reengagement type notification data. Further, a period of inactivity within application 18 may be relatively small. As such, notification client module 22 may determine that the reengagement score for time T1 is relatively low. In other words, because notification client module 22 received the notification data recently and there has not been a long period of time between the first time and when the user last interacted with application 18, the likelihood that the user will want to engage with a reengagement type notification from application 18 may be lower.

Notification client module 22 may determine whether the reengagement score satisfies the reengagement score threshold for time T1. For instance, if the reengagement score is greater than the reengagement score threshold, notification client module 22 may determine that the reengagement score satisfies the reengagement score threshold. In other instances, if a lower score indicates a higher likelihood of interaction, if the reengagement score is less than the reengagement score threshold, notification client module 22 may determine that the reengagement score satisfies the reengagement score threshold. In other words, if the reengagement score satisfies the reengagement score threshold, notification client module 22 may determine that an evaluation of the reengagement score in view of the reengagement score threshold indicates that the user is likely to interact with the reengagement type notification data and application 18. Conversely, if the reengagement score does not satisfy the reengagement score threshold, notification client module 22 may determine that the evaluation of the reengagement score in view of the reengagement score threshold indicates that the user is not likely to interact with the reengagement type notification data and application 18.

If notification client module 22 determines that the reengagement score satisfies the reengagement score threshold for time T1 (i.e., that the user is likely to interact with the reengagement type notification data and application 18), UI module 20 may output, at time T1, the notification alert associated with the notification data. However, as described above, in the example of FIG. 1, notification client module 22 may determine, at time T1, that the reengagement score does not satisfy the reengagement score threshold for time T1 (i.e., that the user is not likely to interact with the reengagement type notification data and application 18). As such, in the example of FIG. 1, UI module 20 may suppress, at time T1, the output of the notification alert associated with the notification data.

In the example of FIG. 1, in suppressing the output of the notification alert, UI module 20 refrains from outputting the notification alert. In other examples, in suppressing the output of the notification alert, UI module 20 may output the notification alert at a lower intensity (e.g., decreased volume, smaller size, etc.) than a normal intensity for the notification alert if notification client module 22 determined that the reengagement score did satisfy the reengagement score threshold.

If at time T1 notification client module 22 determines that the reengagement score does not satisfy the reengagement score threshold, notification client module 22 may store the notification data and repeat the reengagement score determination process at a later time. For instance, at time T2, which is later than time T1, using newly acquired contextual information, notification client module 22 may determine an updated reengagement score threshold based at least in part on contextual information that is indicative of whether the user of computing device 10 is likely to engage with reengagement type notification data at time T2. Notification client module 22 may use a set of conversion rules or various machine learning techniques, described in detail with respect to FIG. 2, to convert the updated contextual information into an updated reengagement score threshold.

For instance, in the example of FIG. 1, at time T2, computing device 10 may be located at the user's home, and the calendar data may indicate that the user is free from any commitments. As such, notification client module 22 may determine the reengagement score threshold to be relatively low. In other words, by setting a low reengagement score threshold, notification client module 22 is determining that notification client module 22 is likely to output reengagement type notifications because the user is in a situation where they may be more likely to engage with such notifications and application 18.

Notification client module 22 may further determine, based at least in part on the notification data, an updated reengagement score associated with the notification data for time T2. Notification client module 22 may use a set of conversion rules or various machine learning techniques, described in detail with respect to FIG. 2, to convert information about the notification data, such as lifespan information of the notification data, usage information for application 18, a reengagement score model, and/or a crowdsourced reengagement score model, into an updated reengagement score.

For instance, a period of inactivity within application 18 may be relatively large. As such, notification client module 22 may determine that the reengagement score for time T2 is relatively high. In other words, because a longer amount of time has passed since notification client module 22 received the notification data and there has been a longer period of time between the first time T2 and when the user last interacted with application 18, the likelihood that the user will want to engage with a reengagement type notification from application 18 may be higher.

If notification client module 22 still determines that the updated reengagement score does not satisfy the updated reengagement score threshold for time T2, UI module 20 may continue to suppress the output of the notification alert associated with the notification data at time T2. However, as described above, in the example of FIG. 1, notification client module 22 may determine, at time T2, that the updated reengagement score does satisfy the updated reengagement score threshold for time T2. As such, in the example of FIG. 1, UI module 20 may output, at time T2, notification alert 16 associated with the notification data in graphical user interface 14B. In the example of FIG. 1, notification alert 16 may be a visual alert in graphical user interface 14B. In some instances, notification alert 16 may be accompanied by an audio alert or a haptic alert (e.g., a vibration).

In other instances, computing device 10 may not suppress the output of the reengagement type notification data upon receipt of the notification data if notification client module 22 determines that the reengagement score satisfies the reengagement score threshold. For instance, the contextual information may indicate that the user is in a situation where they would be likely to interact with notification data from application 18 (e.g., the user is in a quiet, home environment). As such, notification client module 22 may determine a low reengagement score threshold.

Furthermore, notification client module 22 may determine a high reengagement score for the notification data, indicating a higher likelihood that the user will interact with the notification data and application 18. For instance, a usage history for application 18 may indicate that the user typically interacts with application 18 multiple times throughout the day. However, the user may not have interacted with application 18 yet that day. As such, notification client module 22 may determine that, if computing device 10 were to output the notification data, the user would be likely to interact with the notification data and application 18 and, therefore, notification client module 22 may assign the notification data a relatively high reengagement score.

Given this scenario, notification client module 22 may determine that the reengagement score satisfies the reengagement score threshold, meaning that it is likely that the user will interact with the notification data and application 18. As such, notification client module 22 may output the notification alert associated with the notification data.

In this manner, UI module 20 may alert a user of computing device 10 of the receipt of reengagement type notification data at a time that the user is more likely to actually interact with notification alert 16 and application 18. Further, at times where interacting with notification alert 16 may be inappropriate or when the user is not likely to interact with notification alert 16 at all (e.g., when the user is in a business meeting), UI module 20 may refrain from outputting notification alerts that may be overwhelming or annoying to the user of computing device 10. By selectively outputting alerts based on the reengagement score and the reengagement score threshold, UI module 20 may ultimately output fewer alerts by only outputting alerts that are likely to be interacted with rather than merely outputting alerts immediately once notification client module 22 receives the associated notification data. Responsive to outputting fewer alerts, UI module 20 may receive fewer indications of user input from a user interacting with computing device 10 (e.g., to silence or otherwise inhibit ineffective alerts) and may perform fewer operations (e.g., the output of the audio or visual alert or the vibration of computing device 10), thereby consuming less electrical power.

Similarly, a device other than computing device 10, such as a server in network 30, may determine the whether to output alerts. For instance, computing device 10 may upload the reengagement score threshold to be analyzed by a server, and the server may return alerting instructions to computing device 10. For the purpose of this disclosure, alerting instructions include an indication of whether computing device 10 should output the notification alert normally or whether computing device 10 should suppress the notification alert, in accordance with the techniques of this disclosure. Alternatively, some architectures may centralize all notification data through a server component, and then push the notification data from the server to computing device 10. In such an example, the server may also send alerting instructions which could be followed exactly or modified and executed by computing device 10.

Figure 2:
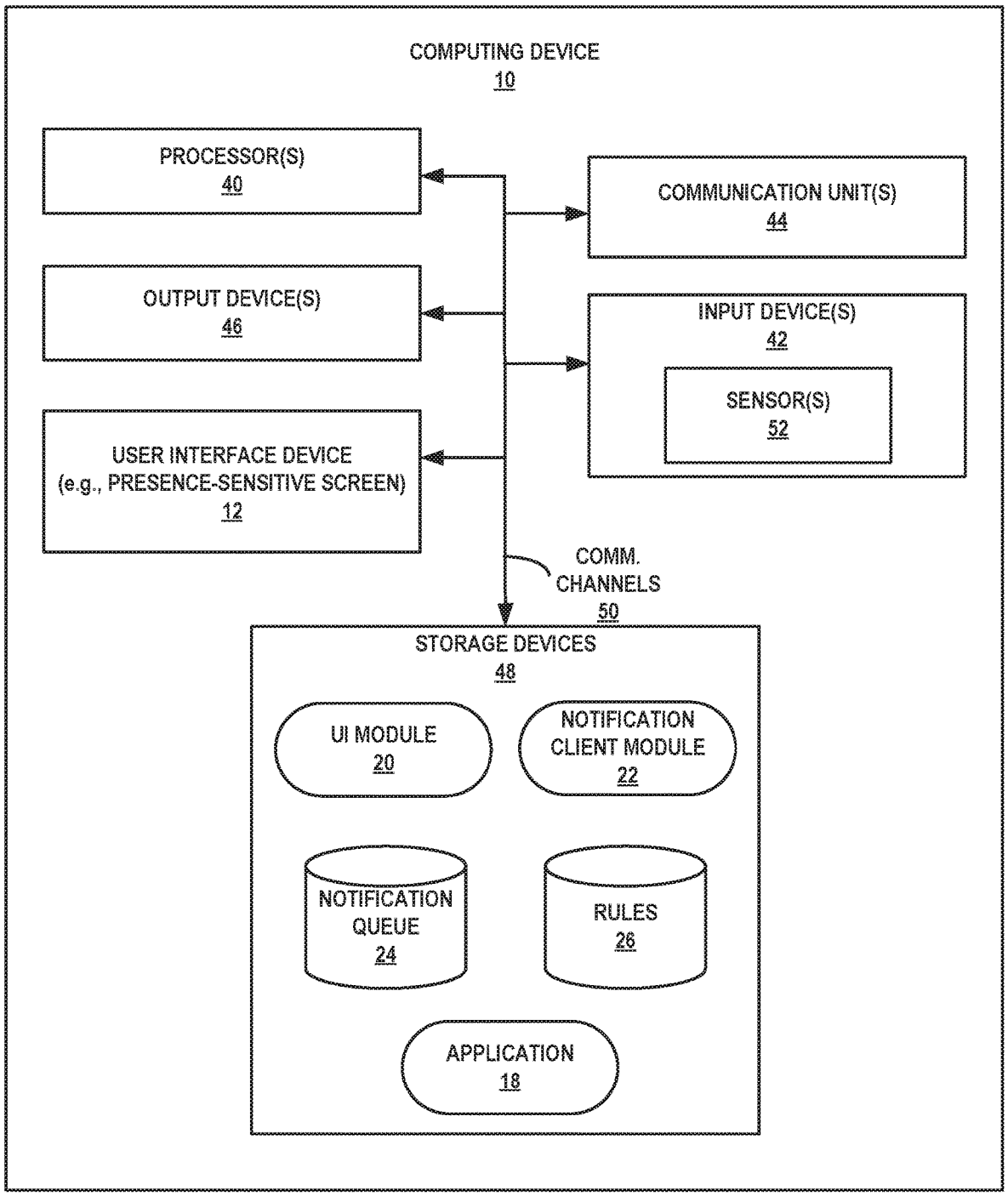
FIG. 2 is a block diagram illustrating an example computing device configured to selectively output alerts associated with reengagement notification data, in accordance with one or more aspects of the present disclosure.

FIG. 2 is a block diagram illustrating an example computing device 10 configured to output alerts associated with reengagement notification data, in accordance with one or more aspects of the present disclosure. Computing device 10 of FIG. 2 is described below within the context of system 1 of FIG. 1. FIG. 2 illustrates only one particular example of computing device 10 and many other examples of computing device 10 may be used in other instances. In the example of FIG. 2, computing device 10 may be a wearable computing device, a mobile computing device, or a non-portable (e.g., desktop, etc.) computing device. Computing device 10 of FIG. 2 may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, one or more storage devices 48, and one or more sensors 52. Storage devices 48 of computing device 10 also include application 18, UI module 20, notification client module 22, notification queue 24, and rules 26. UI module 20 and notification client module 22 may rely on information stored as notification queue 24 and rules 26 at storage device 48. In other words, as is described in more detail below, notification client module 22 may be operable by processors 40 to perform read/write operations on information, stored as notification queue 24, at storage device 48. Notification client module 22 and UI module 20 may then access the information stored in notification queue 24 and rules 26 to perform a function of computing device 10.

Communication channels 50 may interconnect each of the components 12, 18, 20, 22, 24, 26, 40, 42, 44, 46, 48, and 52 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive display, touch-sensitive screen, mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more wired and/or wireless networks by transmitting and/or receiving network signals on the one or more networks. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers.

In some examples, UID 12 of computing device 10 may include functionality of input devices 42 and/or output devices 46. In the example of FIG. 2, UID 12 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 12 presents a user interface (such as user interface 14A or 14B of FIG. 1).

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10 (e.g., computing device 10 may store data (e.g., notification queue 24 and rules 26) that modules 20 and 22 access during execution at computing device 10). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or information (e.g., data) associated with application 18, modules 20 and 22, notification queue 24, and rules 26.

One or more processors 40 may implement functionality and/or execute instructions within computing device 10. For example, processors 40 on computing device 10 may receive and execute instructions stored by storage devices 48 that execute the functionality of UI module 20 and notification client module 22. These instructions executed by processors 40 may cause computing device 10 to determine whether to output alerts and at what intensity to output alerts based on notification data at notification queue 24 and rules 26, within storage devices 48 during program execution. Processors 40 may execute instructions of modules 20 and 22 to cause UID 12 to output alerts based on notification data for display at UID 12 as content of user interface 14A or 14B. That is, modules 20 and 22 may be operable by processors 40 to perform various actions or functions of computing device 10, for instance, causing UID 12 to present user interfaces 14A and 14B at UID 12.

Notification queue 24 represents any suitable storage medium for storing and buffering notification data. For instance, notification queue 24 may be a queue, stack, or buffer for organizing notification data received (e.g., from information server system 60 of FIG. 1 or application 18) by notification client module 22 over time. UI module 20 may access notification queue 24 and initiate output of an alert at varying intensities or refrain from outputting an alert based on determinations made by notification client module 22 related to the output. Notification client module 22 may perform read/write operations for adding information to notification queue 24 (e.g., when notification data is received) or removing information from notification queue 24 (e.g., when UI module outputs an alert associated with the notification data or actively determines to refrain from outputting the alert).

As shown in FIG. 2, computing device 10 may include one or more sensors 52 (sensors 52). Sensors 52 may include an accelerometer that generates accelerometer data. Accelerometer data may indicate an acceleration and/or a change in acceleration of computing device 10. Sensors 52 may include a gyrometer that generates gyrometer data. Gyrometer data may indicate a physical orientation and/or change in physical orientation of computing device 10. In some examples, the orientation may be relative to one or more reference points. Sensors 52 may include a magnetometer that generates magnetometer data. Magnetometer data may indicate the magnetization of an object that is touching or in proximity to computing device 10. Magnetometer data may indicate the Earth's magnetic field, and in some examples, provide directional functionality of a compass.

Sensors 52 may include an ambient light sensor that generates ambient light data. The ambient light data may indicate an intensity of light to which computing device 10 is exposed. Sensors 52 may include a proximity sensor that generates proximity data. Proximity data may indicate whether an object is within proximity to computing device 10. In some examples, proximity data may indicate how close an object is to computing device 10. In some examples, sensors 52 may include a clock that generates a date and time. The date and time may be a current date and time. Sensors 52 may include a pressure sensor that generates pressure data. Pressure data may indicate whether a force is applied to computing device 10 and/or a magnitude of a force applied to computing device 10. Pressure data may indicate whether a force is applied to UID 12 and/or a magnitude of a force applied to UID 12. Sensors 52 may include a video sensor that generates picture or video data. Sensors 52 may include a global positioning system that generates location data. Sensors 52 may also include a clock that generates time data.

If explicit consent is received by computing device 10 from the user of computing device 10 to do so, sensors 52 may begin taking various environmental measurements. Data produced from the measurements of sensors 52 may influence the reengagement score threshold and the reengagement score in accordance with rules data store 26, as determined by notification client module 22. For instance, sensors 52 may take measurements of contextual information indicative of whether the user is likely to engage with reengagement type notification data, such as one or more of a current level of user interaction with computing device 10 (e.g., whether the user is currently interacting with computing device 10, how often the user is inputting commands into computing device 10, etc.), a type of current user interaction with computing device 10 (e.g., what application the user is interacting with on computing device 10, how often the user is switching between applications on computing device 10, etc.), a current ambient noise level (e.g., an ambient noise volume), a current ambient noise type (e.g., is the ambient noise indicative of the user participating in a particular activity or being in a particular setting, etc.), a current location of the computing device (e.g., a home location, an office location, a moving vehicle, an outdoor location, etc.), calendar data stored on the computing device (e.g., is the user in a meeting or are they available), or a first time (e.g., is the time indicative of the user being in a particular setting), among other things.

Rules data store 26 represents any suitable storage medium for storing and buffering rules and reference characteristics that UI module 20 may access when determining a reengagement score and a reengagement score threshold. Rules data store 26 may include instructions for converting various information into the reengagement score and the reengagement score threshold. This information may include information measured by sensors 52, received from application 18, included with the notification data, stored in a reengagement score model, stored in a crowdsourced reengagement score model, and received from outside computing devices, among other things.

In accordance with techniques of this disclosure, each piece of information described above may influence the reengagement score and reengagement score threshold in a unique way according to rules 26. For instance, notification client module 22 may determine a lower reengagement score threshold when the current level of user interaction with computing device 10 is high, as the user may be more likely to be bored and more likely to interact with application 18 if the user is heavily interacting with computing device 10. Conversely, notification client module 22 may determine a higher reengagement score threshold when the current level of user interaction with computing device 10 is low, as the user may be too busy with other activities for there to be a likely chance that the user would interact with application 18 upon outputting the reengagement type notification data.

A type of current user interaction with computing device 10 (e.g., what application the user is interacting with on computing device 10, how often the user is switching between applications on computing device 10, etc.) may influence the reengagement score threshold in conjunction with the current level of user interaction. Notification client module 22 may determine a lower reengagement score threshold when the user is switching between various applications or if the user is currently viewing a casual application (e.g., a gaming application, a social media application, etc.), as the user may be more likely to be bored and more likely to interact with application 18. Conversely, notification client module 22 may determine a higher reengagement score threshold when the user is accessing a smaller number of applications or if the applications are business-like applications (e.g., a calendar application, a word processing application, a document viewing application, etc.), as the user may be too busy with other activities for there to be a likely chance that the user would interact with application 18 upon outputting the reengagement type notification data.

A current ambient noise level (e.g., an ambient noise volume) may also influence the reengagement score threshold. Notification client module 22 may determine a lower reengagement score threshold when the current ambient noise level is low, as the user may be more likely to be bored and more likely to interact with application 18 if there is less background noise. Conversely, notification client module 22 may determine a higher reengagement score threshold when the current ambient noise level is high, as the higher ambient noise level may indicate that the user is being engaged my other stimuli and would be less likely to interact with application 18.

A current ambient noise type (e.g., is the ambient noise indicative of the user participating in a particular activity or being in a particular setting, etc.) may further influence the reengagement score threshold in conjunction with the current ambient noise level. Notification client module 22 may determine a lower reengagement score threshold when the ambient noise indicates that the user is in a quiet environment or partaking in a low attention activity (e.g., listening to music or watching television), as the user may be more likely to be bored and more likely to interact with application 18 if the user is not in an environment where the stimuli in their immediate vicinity require the user's attention. Conversely, notification client module 22 may determine a higher reengagement score threshold when the ambient noise indicates that the user is having a conversation or participating in an activity that requires the user's attention, as the user may be less likely interact with application 18 upon outputting the reengagement type notification data if the user is in an environment where using computing device 10 would be inappropriate or rude.

A current location of the computing device (e.g., a home location, an office location, a moving vehicle, an outdoor location, etc.) may also influence the reengagement score threshold. Notification client module 22 may determine a lower reengagement score threshold when the user is at home or in a waiting room of an office, as the user may be more likely to be bored and more likely to interact with application 18 if the user is in such a location. Conversely, notification client module 22 may determine a higher reengagement score threshold when the user is in an office, at the home of another person, a movie theatre, a restaurant or any other location that may stimulate the user's attention, as the user may be too busy with other activities at such a location for there to be a likely chance that the user would interact with application 18 upon outputting the reengagement type notification data.

Calendar data stored on the computing device (e.g., is the user in a meeting or are they available) may also influence the reengagement score threshold. Notification client module 22 may determine a lower reengagement score threshold when the calendar data indicates that the user is not partaking in another activity, as the user may be more likely to be bored and more likely to interact with application 18 if the user does not have any previously scheduled activities at that time. Conversely, notification client module 22 may determine a higher reengagement score threshold when the calendar data indicates that the user does have a scheduled activity at the first time, as the user may be busy with the schedules activity and not be likely to interact with application 18 upon outputting the reengagement type notification data.

A first time (e.g., is the time indicative of the user being in a particular setting) may further influence the reengagement score threshold. Notification client module 22 may determine a lower reengagement score threshold when the first time is a time that the user is not generally partaking in other activities (e.g., evenings, weekends, lunch hours, etc.), as the user may be more likely to be bored and more likely to interact with application 18 during these slower times. Conversely, notification client module 22 may determine a higher reengagement score threshold when the first time is a time that the user is typically performing another activity (e.g., the user is working during the day on weekdays, the user is sleeping late at night into early in the morning, etc.), as the user not be likely to interact with application 18 upon outputting the reengagement type notification data at these times.

Data received from received from application 18 may influence the reengagement score. This data may include a general frequency that the user interacts with application 18, an application type of application 18 (e.g., a gaming application, a social media application, a music streaming application, etc.), and a length of time that has passed since the user last interacted with application 18. Notification client module 22 may determine a lower reengagement score threshold when application 18 is an application that the user frequently engages with or if a relatively large amount of time has passed since the user last interacted with application 18, as the user may be more likely to interact with application 18 under these circumstances. Conversely, notification client module 22 may determine a higher reengagement score threshold if application 18 is an application that the user does not interact with often or if a relatively small amount of time has passed since the user last interacted with application 18, as the user may be less likely to interact with application 18 upon outputting the reengagement type notification data under these circumstances.

Data included with the notification data may also influence the reengagement score. This data may include lifespan information associated with the notification data (e.g., a time at which the notification data is no longer relevant). Notification client module 22 may determine a lower reengagement score when the lifespan information indicates that the notification data will not expire for some distant amount of time after the first time, as there may be a more efficient or more effective time in the future to output the notification alert. Conversely, notification client module 22 may determine a higher reengagement score when the lifespan information indicates that the notification data will expire soon, as application 18 may prefer to output the notification data at some point rather than to let the notification data expire.

Data stored in a reengagement score model may further influence the reengagement score. The reengagement score model may include past instances of outputting similar notification data under similar circumstances and whether the user engaged with the output notification alert. Notification client module 22 may determine a lower reengagement score when the reengagement score model indicates that, under similar circumstances, the user did not interact with similar notification data. Conversely, notification client module 22 may determine a higher reengagement score when the reengagement score model indicates that, under similar circumstances, the user did interact with similar notification data.

Data stored in a crowdsourced reengagement score model may also influence the reengagement score. The crowdsourced reengagement score model may include past instances of outputting similar notification data under similar circumstances and whether users of other computing devices different from computing device 10 engaged with the output notification alert. Notification client module 22 may determine a lower reengagement score when the crowdsourced reengagement score model indicates that, under similar circumstances, the other users did not interact with similar notification data. Conversely, notification client module 22 may determine a higher reengagement score when the crowdsourced reengagement score model indicates that, under similar circumstances, the other users did interact with similar notification data.

Data received from outside computing devices may influence the reengagement score threshold. This data could include information from a computerized watch, a computerized vehicle, or any other computing device that may contain information that may be indicative of whether a user of the computing device is likely to engage with reengagement type notification data at the first time. Notification client module 22 may determine a lower reengagement score threshold when the data from outside computing devices indicate that the user is at rest, a passenger in the vehicle, or in any other state where the user may not be directing their focus to a specific activity, as the user may be more likely to be bored and more likely to interact with application 18 in such examples. Conversely, notification client module 22 may determine a higher reengagement score threshold when the data from outside computing devices indicate that the user is in motion, driving the vehicle, or in any other state where the user may be directing their focus to a specific activity, as the user may be too busy with other activities for there to be a likely chance that the user would interact with application 18 upon outputting the reengagement type notification data.

In accordance with techniques of this disclosure, notification client module 22 of computing device 10 may receive notification data from application 18 as application 18 executes at computing device 10. In the example of FIG. 1, application 18 may be a music streaming application, and the notification data may be reengagement type notification data with information, that when presented to the user, is an attempt by developers of application 18 to convince the user to interact with application 18 on computing device 10 and stream new additions to the music library available on application 18. In other examples, the notification data may be informational type notification data associated with application 18, such as an indication that a time-based event within application 18 has either begun or expired, or that a particular action is complete.

Notification client module 22 may determine whether notification data received by computing device 10 is reengagement type notification data. In some examples, the notification data may include metadata indicating whether the notification data is reengagement type notification data or informational type notification data. In other instances, application 18 may generate an extra indication that defines the type of the notification data. If notification client module 22 determines that the notification data is not reengagement type notification data (e.g., informational type notification data), UI module 20 may output, at a first time, a notification alert associated with the notification data. As non-reengagement type notification data may be more important or contain more time-sensitive material than reengagement type notification data, UI module 20 may output the notification alert associated with the non-reengagement type notification data upon receipt of the notification data. For instance, the notification data may include an indication that an update to the application 18 that fixes a significant coding error in the previous version of application 18 has been released and that the user should download the updated application 18.

If, however, notification client module 22 determines that the notification data is reengagement type notification data, notification client module 22 may determine, based at least in part on contextual information that is indicative of whether a user of computing device 10 is likely to engage with reengagement type notification data at the first time, a reengagement score threshold for the first time. Prior to collecting contextual information, computing device 10 may prompt a user of computing device 10 for explicit consent to collect the contextual information.

The contextual information may include one or more of a current level of user interaction with computing device 10, a type of current user interaction with computing device 10, a current ambient noise level, a current ambient noise type, a current location of the computing device, calendar data stored on the computing device, or a first time, among other things. For example, prior to retaining contextual information associated with the user of computing device 10, UI module 20 may present a user interface via UI device 12 that requests a user to select a box, click a button, state a voice input, or otherwise provide a specific input to the user interface that is interpreted by computing device 10 as unambiguous, affirmative consent for application extension 23 to collect and make use of the user's personal information and the contextual information. At this point, computing device 10 may continue to execute the remainder of the techniques described herein. For instance, after computing device 10 receives user input indicating that the user consents to the collection of the contextual information about the user and device information describing computing device 10 or a surrounding environment of computing device 10, computing device 10 may proceed to collect said contextual information.

Using this contextual information, notification client module 22 may determine a reengagement score threshold indicative of whether a user of computing device 10 is likely to engage with reengagement type notification data at the first time. Notification client module 22 may use rules or various machine learning techniques as described in detail above with respect to rules data store 26 to convert the gathered contextual information into a reengagement score threshold.

In the example of FIG. 2, at the first time, computing device 10 may be located at a movie theatre, the current ambient noise level may be high, and the user may not be interacting with computing device 10 at all. As such, notification client module 22 may determine the reengagement score threshold to be high, indicating that the user may be busy with other stimuli (e.g., the movie playing at the movie theatre) and, therefore, unlikely to be able to engage or unlikely to be interested in engaging with reengagement type notifications, in general, at the first time. In other words, by setting a high reengagement score threshold, notification client module 22 is determining that notification client module 22 is unlikely to output reengagement type notifications unless the reengagement type notifications have particular characteristics, as the user is unlikely to interact with such notification data and application 18.

Notification client module 22 may further determine, based at least in part on the notification data, a reengagement score associated with the notification data for the first time. Notification client module 22 may use a set of conversion rules or various machine learning techniques, as described above with respect to rules data store 26, to convert information about the notification data into a reengagement score. For instance, according to a reengagement score model stored in rules data store 26, in similar situations in the past (i.e., the user is at a movie theatre, the ambient noise level is high, and the user is not currently interacting with computing device 10), the user may not have interacted with computing device 10 when a notification alert associated with application 18 was output. As such, notification client module 22 may determine that the reengagement score for the first time is relatively low. In other words, because notification client module 22 determines that the user does not typically interact with reengagement type notifications in this particular situation, the likelihood that the user will want to engage with a reengagement type notification from application 18 at the first time may be lower.

Notification client module 22 may determine whether the reengagement score satisfies the reengagement score threshold for the first time. For instance, if the reengagement score is greater than the reengagement score threshold, notification client module 22 may determine that the reengagement score satisfies the reengagement score threshold. In other words, if the reengagement score satisfies the reengagement score threshold, notification client module 22 may determine that the combination of the reengagement score and the reengagement score threshold indicates that the user is likely to interact with the reengagement type notification data and application 18. Conversely, if the reengagement score does not satisfy the reengagement score threshold, notification client module 22 may determine that the combination of the reengagement score and the reengagement score threshold indicates that the user is not likely to interact with the reengagement type notification data and application 18.

If notification client module 22 determines that the reengagement score satisfies the reengagement score threshold for the first time (i.e., that the user is likely to interact with the reengagement type notification data and application 18), UI module 20 may output the notification alert associated with the notification data. However, if notification client module 22 determines that the reengagement score does not satisfy the reengagement score threshold for the first time (i.e., that the user is not likely to interact with the reengagement type notification data and application 18), UI module 20 may suppress, at or after the first time, the output of the notification alert associated with the notification data.

In some instances, in suppressing the output of the notification alert, UI module 20 may refrain from outputting the notification alert entirely. In other instances, in suppressing the output of the notification alert, UI module 20 may output the notification alert at a lower intensity (e.g., decreased volume, smaller size, a vibration with a decreased intensity, etc.) than a normal intensity for the notification alert if notification client module 22 determined that the reengagement score did satisfy the reengagement score threshold.

If notification client module 22 determines that the reengagement score does not satisfy the reengagement score threshold for the first time, notification client module 22 may store the notification data in notification queue 24 and repeat the reengagement score determination process at a later time. For instance, at the later time, using newly acquired contextual information, notification client module 22 may determine an updated reengagement score threshold based at least in part on contextual information that is indicative of whether the user of computing device 10 is likely to engage with reengagement type notification data at the later time.

For instance, in the example of FIG. 2, at the later time, computing device 10 may be located at a gym, and the ambient noise level may be low to moderate, and the user may be browsing social media applications. As such, notification client module 22 may determine the reengagement score threshold to be relatively low. In other words, by setting a low reengagement score threshold, notification client module 22 is determining that notification client module 22 is likely to output reengagement type notifications because the user is in a situation where they may be more likely to engage with such notifications and application 18, as listening to music at the gym may be desirable.

Notification client module 22 may further determine, based at least in part on the notification data, an updated reengagement score associated with the notification data for the later time. For instance, the reengagement score model may indicate that, in similar situations in the past (i.e., the user was at the gym, the ambient noise level was low to moderate, and the user was interacting with computing device 10 already), the user routinely streamed music and interacted with notification data associated with application 18. As such, notification client module 22 may determine that the reengagement score for the later time is relatively high. In other words, because the reengagement score model indicates that the user is likely to engage with the notification data, notification client module 22 may determine the reengagement score to be higher.

If notification client module 22 still determines that the updated reengagement score does not satisfy the updated reengagement score threshold for the later time, UI module 20 may continue to suppress the output of the notification alert associated with the notification data at the later time. However, if notification client module 22 determines that the updated reengagement score does satisfy the updated reengagement score threshold for the later time, UI module 20 may output, at the later time a notification alert associated with the notification data. In the example of FIG. 2, the notification alert may be a visual alert, an audio alert, a haptic alert (e.g., a vibration), or any combination of the three.

If notification client module 22 still determines that the updated reengagement score does not satisfy the updated reengagement score threshold for the later time, notification module 22 may again repeat the reengagement score determination process at an even later time, potentially recursively repeating the reengagement score determination process until notification module 22 determines that the new reengagement score satisfies the reengagement score threshold. If, however, the time defined by the lifespan information of the notification data passes and UI module 20 has still not output the notification alert associated with the notification data, notification client module 22 may, in some instances, delete the notification data from notification queue 24 without outputting the notification alert. In other instances, notification client module 22 may output the notification alert at the expiration time defined in the lifespan information without regard to whether the reengagement score satisfies the reengagement score threshold.

Once UI module 20 outputs the notification alert, computing device 10 may employ machine learning techniques to update the reengagement score model stored in rules data store 26. For instance, notification client module 22 may determine whether computing device 10 has received an indication of user input indicative of an interaction with the notification alert once UI module 20 outputs the notification alert. If computing device 10 has received such an indication, notification client module 22 may update the reengagement score model to indicate a positive result given the contextual information. Conversely, if computing device 10 has not received such an indication after a certain amount of time has passed, notification client module 22 may update the reengagement score model to indicate a negative result given the contextual information. In other words, by updating the reengagement score model in such a way, if similar situations are encountered in the future, notification client module 22 may assign a lower or higher reengagement score to the notification data based on past indications of what the user previously did in the same situation. In this way, the user's past actions may influence notification client module 22's future determinations.

Figure 3:
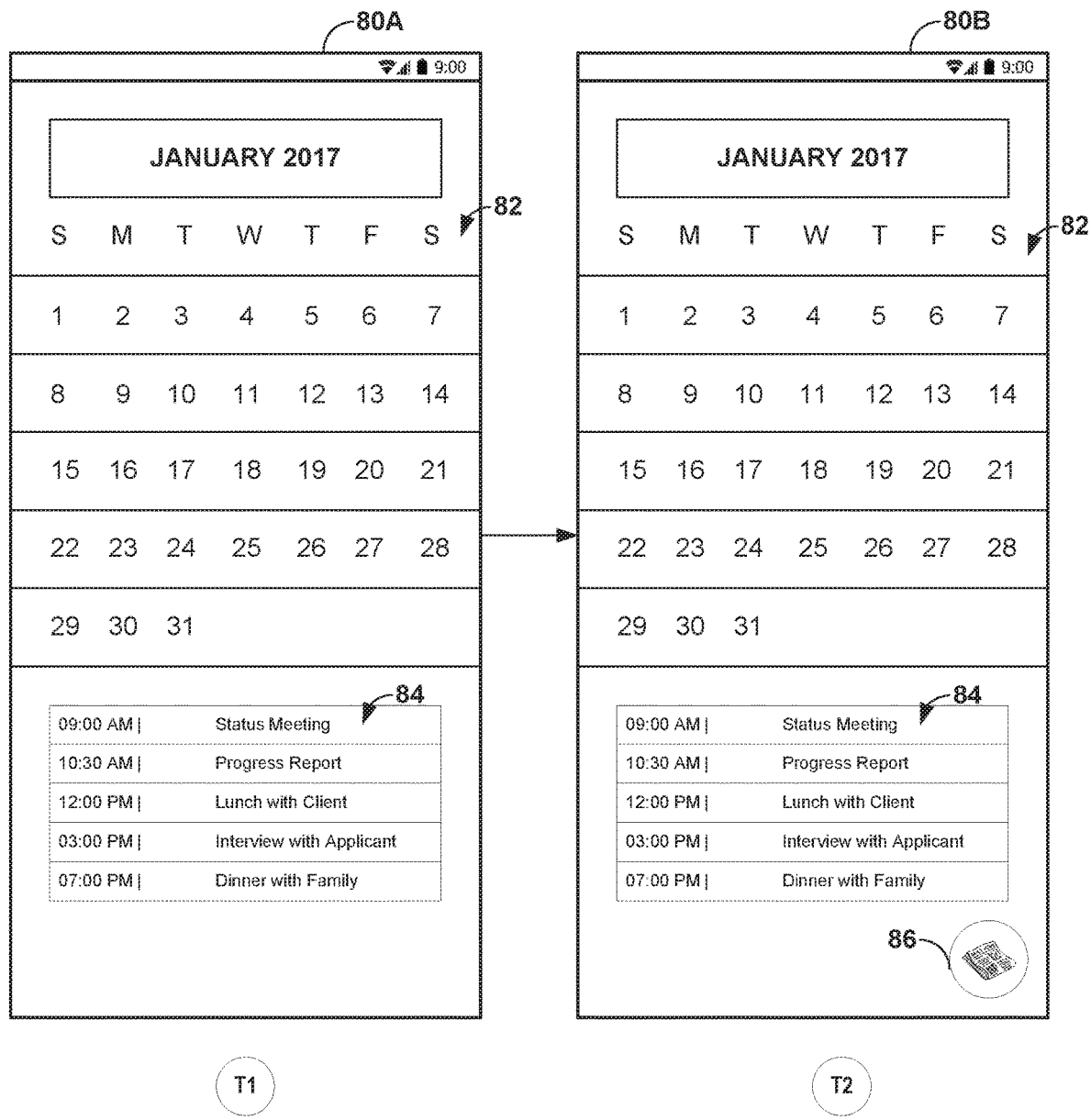
FIG. 3 is a first conceptual diagram illustrating timing characteristics of an example computing device configured to selectively output alerts associated with reengagement notification data, in accordance with one or more aspects of the present disclosure.

FIG. 3 is a first conceptual diagram illustrating timing characteristics of an example computing device configured to output alerts associated with reengagement notification data, in accordance with one or more aspects of the present disclosure. The operations of computing device 10 are described within the context of system 1 of FIG. 1 and computing device 10 of FIG. 2.

At time T1, computing device 10 may be outputting graphical user interface (GUI) 80A, as the user may be interacting with a calendar application. GUI 80A may include date portion 82 and meeting portion 84. In general, the user may be analyzing their schedule for the upcoming day or some other important function.

At some point between time T1 and time T2, computing device 10 may receive notification data associated with a news application. At that time, computing device 10 may determine a reengagement score threshold based on contextual information that is indicative of whether a user of the computing device is likely to engage with reengagement type notification data at the first time. In the example of FIG. 3, the contextual information, such as application usage data from the application currently executing on computing device 10 and outputting GUI 80A for display on computing device 10, may indicate that the user is busy checking their calendar application and that a full notification alert may be cumbersome and unwanted unless the notification was especially important. As such, computing device 10 may determine that the reengagement score threshold is relatively high so as to prevent alerts to notifications that are not especially important from distracting or annoying the user.

Based on characteristics described above with respect to rules data store 26 of FIG. 2, computing device 10 may further determine a reengagement score for the notification data. In the example of FIG. 3, computing device 10 may determine that the reengagement score does not satisfy the reengagement score threshold. As such, at time T2, computing device 10 may suppress the output of the notification alert associated with the notification data from the news application.

In the example of FIG. 3, in suppressing the notification data, computing device 10 outputs notification alert 86 at time T2 in GUI 80B, where notification alert 86 is smaller and in a less intrusive position than what the notification alert would comprise if computing device 10 determined that the reengagement score satisfied the reengagement score threshold. In other instances, computing device 10 may suppress the output of notification alert 86 by not outputting notification alert 86 at all.

Figure 4:
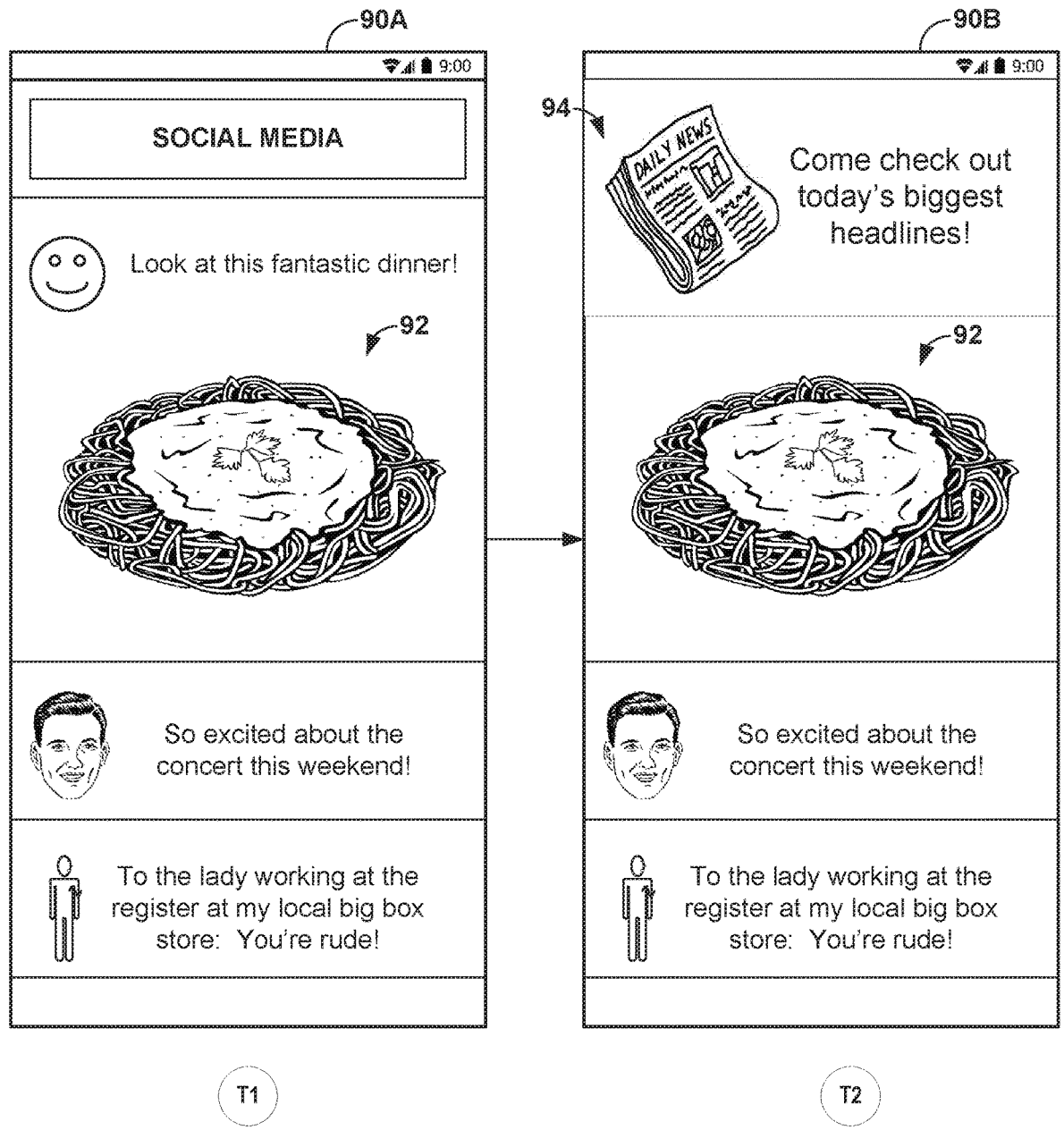
FIG. 4 is a second conceptual diagram illustrating timing characteristics of an example computing device configured to selectively output alerts associated with reengagement notification data, in accordance with one or more aspects of the present disclosure.

FIG. 4 is a second conceptual diagram illustrating timing characteristics of an example computing device configured to output alerts associated with reengagement notification data, in accordance with one or more aspects of the present disclosure. The operations of computing device 10 are described within the context of system 1 of FIG. 1 and computing device 10 of FIG. 2.

At time T1, computing device 10 may be outputting graphical user interface (GUI) 90A, as the user may be interacting with a social media application. GUI 80A may include social media posts 92. In general, the user may be browsing the social media application out of boredom to read updates on their family and friends.

At some point between time T1 and time T2, computing device 10 may receive notification data associated with the news application. At that time, computing device 10 may determine a reengagement score threshold based on contextual information that is indicative of whether a user of the computing device is likely to engage with reengagement type notification data at the first time. In the example of FIG. 4, the contextual information, such as application usage data from the application currently executing on computing device 10 and outputting GUI 90A for display on computing device 10, may indicate that the user is in search of entertainment and that a reengagement notification with a different application may be welcomed and appreciated. As such, computing device 10 may determine that the reengagement score threshold is relatively low, indicating that the user is not exceptionally busy and that the user may be willing to switch applications or engage with the reengagement type notification data.

Based on characteristics described above with respect to rules data store 26 of FIG. 2, computing device 10 may further determine a reengagement score for the notification data. In the example of FIG. 4, computing device 10 may determine that the reengagement score satisfies the low reengagement score threshold. As such, at time T2, computing device 10 may output notification alert 94 associated with the notification data from the news application, encouraging the user to read the newest headlines.

Figure 5:
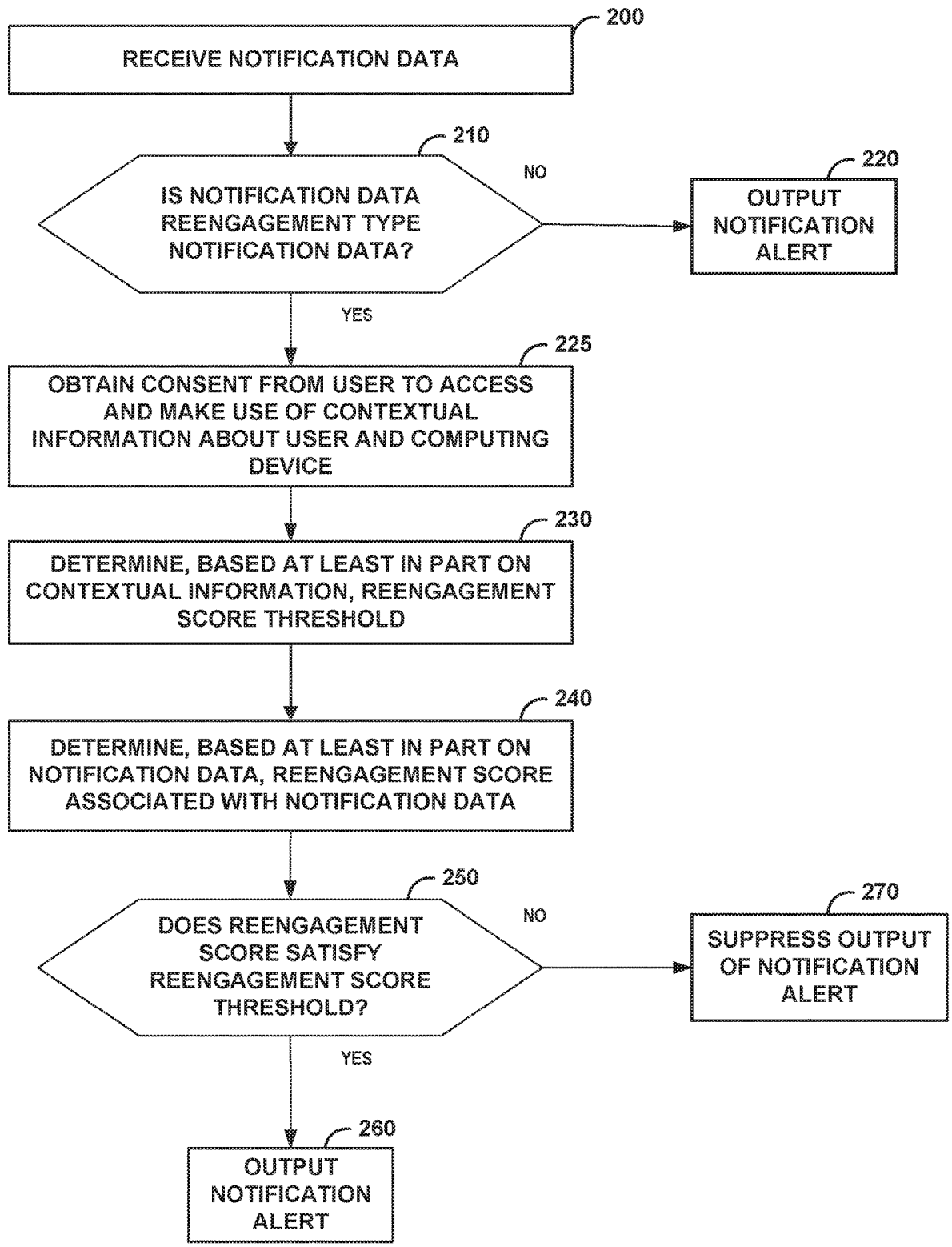
FIG. 5 is a flowchart illustrating further example operations of an example computing device configured to selectively output alerts associated with reengagement notification data, in accordance with one or more aspects of the present disclosure.

FIG. 5 is a flowchart illustrating further example operations of an example computing device configured to output alerts associated with reengagement notification data, in accordance with one or more aspects of the present disclosure. The operations of computing device 10 are described within the context of system 1 of FIG. 1 and computing device 10 of FIG. 2.

In accordance with techniques of this disclosure, notification client module 22 of computing device 10 may receive notification data from application 18 as application 18 executes at computing device 10 (200). In the example of FIG. 1, application 18 may be a weight loss application, and the notification data may be reengagement type notification data with information, that when presented to the user, is an attempt by developers of application 18 to convince the user to interact with application 18 on computing device 10 and enter their food intake for the current day. In other examples, the notification data may be informational type notification data associated with application 18, such as an indication that a time-based event within application 18 has either begun or expired, or that a particular action is complete.

Notification client module 22 may determine whether notification data received by computing device 10 is reengagement type notification data (210). In some examples, the notification data may include metadata indicating whether the notification data is reengagement type notification data or informational type notification data. In other instances, application 18 may generate an extra indication that defines the type of the notification data. If notification client module 22 determines that the notification data is not reengagement type notification data (e.g., informational type notification data) (NO branch of 210), UI module 20 may output, at a first time, a notification alert associated with the notification data (220).

Prior to collecting contextual information, computing device 10 may prompt a user of computing device 10 for explicit consent to collect and make use of contextual information about the user of computing device 10 and computing device 10 itself. The contextual information may include one or more of a current level of user interaction with computing device 10 (e.g., whether the user is currently interacting with computing device 10, how often the user is inputting commands into computing device 10, etc.), a type of current user interaction with computing device 10 (e.g., what application the user is interacting with on computing device 10, how often the user is switching between applications on computing device 10, etc.), a current ambient noise level (e.g., an ambient noise volume), a current ambient noise type (e.g., is the ambient noise indicative of the user participating in a particular activity or being in a particular setting, etc.), a current location of the computing device (e.g., a home location, an office location, a moving vehicle, an outdoor location, etc.), calendar data stored on the computing device (e.g., is the user in a meeting or are they available), or a first time (e.g., is the time indicative of the user being in a particular setting), among other things. For example, prior to retaining contextual information associated with the user of computing device 10, UI module 20 may present a user interface via UI device 12 that requests a user to select a box, click a button, state a voice input, or otherwise provide a specific input to the user interface that is interpreted by computing device 10 as unambiguous, affirmative consent for application extension 23 to collect and make use of the user's personal information and the contextual information. At this point, computing device 10 may continue to execute the remainder of the techniques described herein. For instance, after computing device 10 receives user input indicating that the user consents to the collection of the contextual information about the user and device information describing computing device 10 or a surrounding environment of computing device 10, computing device 10 may proceed to collect said contextual information. If, however, notification client module 22 determines that the notification data is reengagement type notification data (YES branch of 210), notification client module 22 may determine, based at least in part on contextual information that is indicative of whether a user of computing device 10 is likely to engage with reengagement type notification data at the first time, a reengagement score threshold for the first time (230). Prior to collecting contextual information, computing device 10 may prompt a user of computing device 10 for explicit consent to collect the contextual information.

The contextual information may include one or more of a current level of user interaction with computing device 10, a type of current user interaction with computing device 10, a current ambient noise level, a current ambient noise type, a current location of the computing device, calendar data stored on the computing device, or a first time, among other things. For example, prior to retaining contextual information associated with the user of computing device 10, UI module 20 may present a user interface via UI device 12 that requests a user to select a box, click a button, state a voice input, or otherwise provide a specific input to the user interface that is interpreted by computing device 10 as unambiguous, affirmative consent for application extension 23 to collect and make use of the user's personal information and the contextual information. At this point, computing device 10 may continue to execute the remainder of the techniques described herein. For instance, after computing device 10 receives user input indicating that the user consents to the collection of the contextual information about the user and device information describing computing device 10 or a surrounding environment of computing device 10, computing device 10 may proceed to collect said contextual information.

Using this contextual information, notification client module 22 may determine a reengagement score threshold indicative of whether a user of computing device 10 is likely to engage with reengagement type notification data at the first time. Notification client module 22 may use rules or various machine learning techniques as described in detail above with respect to rules data store 26 to convert the gathered contextual information into a reengagement score threshold.

In the example of FIG. 2, at the first time, computing device 10 may be located at a school, and the first time may be around lunch time. As such, notification client module 22 may determine the reengagement score threshold to be high, indicating that the user is unlikely to be interested in entering their food intake for the day at such an early time. In other words, by setting a high reengagement score threshold, notification client module 22 is determining that notification client module 22 is unlikely to output reengagement type notifications unless the reengagement type notifications have particular characteristics, as the user is unlikely to interact with such notification data and application 18.

Notification client module 22 may further determine, based at least in part on the notification data, a reengagement score associated with the notification data for the first time (240). Notification client module 22 may use a set of conversion rules or various machine learning techniques, as described above with respect to rules data store 26 of FIG. 2, to convert information about the notification data into a reengagement score. For instance, according to a crowd-sourced reengagement score model stored in rules data store 26, in similar situations in the past (i.e., the user is at school during lunch time), other users of computing devices different than computing device 10 may not have interacted with their respective when a notification alert associated with application 18 was output. As such, notification client module 22 may determine that the reengagement score for the first time is relatively low. In other words, because notification client module 22 determines that the other users does not typically interact with reengagement type notifications in this particular situation, the likelihood that the user will want to engage with a reengagement type notification from application 18 at the first time may be lower.

Notification client module 22 may determine whether the reengagement score satisfies the reengagement score threshold for the first time (250). For instance, if the reengagement score is greater than the reengagement score threshold, notification client module 22 may determine that the reengagement score satisfies the reengagement score threshold. In other words, if the reengagement score satisfies the reengagement score threshold, notification client module 22 may determine that the combination of the reengagement score and the reengagement score threshold indicates that the user is likely to interact with the reengagement type notification data and application 18. Conversely, if the reengagement score does not satisfy the reengagement score threshold, notification client module 22 may determine that the combination of the reengagement score and the reengagement score threshold indicates that the user is not likely to interact with the reengagement type notification data and application 18.

If notification client module 22 determines that the reengagement score satisfies the reengagement score threshold for the first time (YES branch of 250), UI module 20 may output the notification alert associated with the notification data (260). However, if notification client module 22 determines that the reengagement score does not satisfy the reengagement score threshold for the first time (NO branch of 250), UI module 20 may suppress, at or after the first time, the output of the notification alert associated with the notification data (270).

In some instances, in suppressing the output of the notification alert, UI module 20 may refrain from outputting the notification alert entirely. In other instances, in suppressing the output of the notification alert, UI module 20 may output the notification alert at a lower intensity (e.g., decreased volume, smaller size, a vibration with a decreased intensity, etc.) than a normal intensity for the notification alert if notification client module 22 determined that the reengagement score did satisfy the reengagement score threshold.

If notification client module 22 determines that the reengagement score does not satisfy the reengagement score threshold for the first time, notification client module 22 may store the notification data in notification queue 24 and repeat the reengagement score determination process at a later time. For instance, at the later time, using newly acquired contextual information, notification client module 22 may determine an updated reengagement score threshold based at least in part on contextual information that is indicative of whether the user of computing device 10 is likely to engage with reengagement type notification data at the later time.

For instance, in the example of FIG. 2, at the later time, computing device 10 may be located at home, and the time may be just before the user typically goes to sleep. As such, notification client module 22 may determine the reengagement score threshold to be relatively low. In other words, by setting a low reengagement score threshold, notification client module 22 is determining that notification client module 22 is likely to output reengagement type notifications because the user is in a situation where they may be more likely to engage with such notifications and application 18, as the user is most likely done consuming food for the day and would reasonably expect to want to enter their food intake for the day.

Notification client module 22 may further determine, based at least in part on the notification data, an updated reengagement score associated with the notification data for the later time. For instance, the crowdsourced reengagement score model may indicate that, in similar situations in the past (i.e., the user was at home at bed time), the other users routinely entered their daily food intake into application 18. As such, notification client module 22 may determine that the reengagement score for the later time is relatively high. In other words, because the crowdsourced reengagement score model indicates that the user is likely to engage with the notification data, notification client module 22 may determine the reengagement score to be higher.

If notification client module 22 still determines that the updated reengagement score does not satisfy the updated reengagement score threshold for the later time, UI module 20 may continue to suppress the output of the notification alert associated with the notification data at the later time. However, if notification client module 22 determines that the updated reengagement score does satisfy the updated reengagement score threshold for the later time, UI module 20 may output, at the later time a notification alert associated with the notification data. In the example of FIG. 5, the notification alert may be a visual alert, an audio alert, a haptic alert (e.g., a vibration), or any combination of the three.

Figure 6:
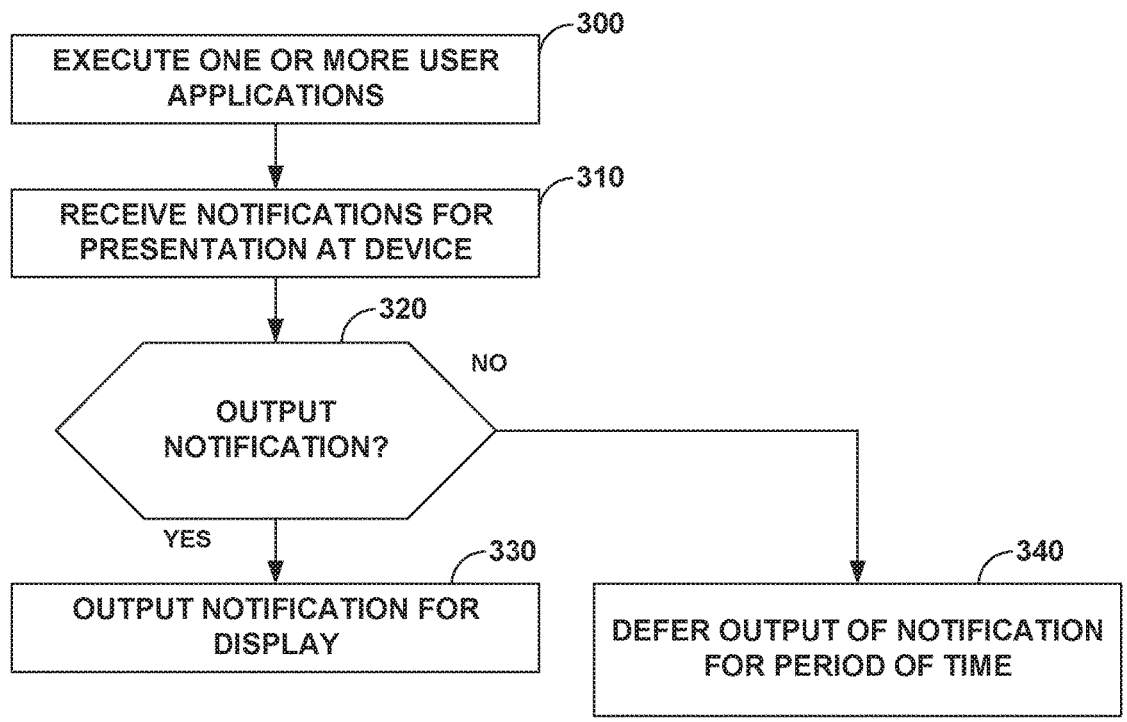
FIG. 6 is a flowchart illustrating further example operations of an example computing device configured to selectively output alerts associated with reengagement notification data, in accordance with one or more aspects of the present disclosure.

FIG. 6 is a flowchart illustrating further example operations of an example computing device configured to selectively output alerts associated with reengagement notification data, in accordance with one or more aspects of the present disclosure. The operations of computing device 10 are described within the context of system 1 of FIG. 1 and computing device 10 of FIG. 2.

In accordance with the techniques of this disclosure, computing device 10 may execute one or more applications 18 (300). Notification client module 22 may receive, from the one or more applications 18, notifications for presentation to a user of computing device 10 (310). Notification client module 320 may determine whether to present or output respective alerts for at least some of those notifications for presentation to the user (320). If notification client module 22 determines to output an alert for a notification for presentation ("YES" branch of 320), notification client module 22 may output the alert for the notification for display at computing device 10 (330). Conversely, if notification client module 22 determines to not output the notification ("NO" branch of 320), notification client module 22 may defer the output of the alert for the notification for a period of time (340).

In some examples, notification client module 22 may determine characteristics of the deferment. For instance, notification client module 22 may determine a period of deferment time. Notification client module 22 may also generate an indication of expected user attention to a presented notification at a first time (e.g., the reengagement score threshold) for use in deciding whether to present the notification or defer the presentation of the notification.

The techniques described with respect to FIG. 6 may be implemented in addition to, in place of, or in conjunction with any of the techniques described throughout the remainder of this disclosure. For instance, in addition to the techniques of FIG. 6, notification client module 22 may determine a reengagement score for the notification data based at least in part on the notification data.

Example 1

A method comprising: determining whether notification data received by a computing device is reengagement type notification data; if the notification data is not reengagement type notification data, outputting a notification alert associated with the notification data; and if the notification data is reengagement type notification data: determining, based at least in part on contextual information that is indicative of whether a user of the computing device is likely to engage with reengagement type notification data at a first time, a reengagement score threshold for the first time; determining, based at least in part on the notification data, a reengagement score associated with the notification data for the first time; determining whether the reengagement score satisfies the reengagement score threshold for the first time; if the reengagement score satisfies the reengagement score threshold for the first time, outputting, at or after the first time, the notification alert associated with the notification data; and if the reengagement score does not satisfy the reengagement score threshold for the first time, suppressing, at or after the first time, output of the notification alert associated with the notification data.

Example 2

The method of example 1, further comprising: if the reengagement score does not satisfy the reengagement score threshold for the first time: determining, based at least in part on contextual information that is indicative of whether a user of the computing device is likely to engage with reengagement type notification data at a second time later than the first time, an updated reengagement score threshold for the second time; determining, based at least in part on the notification data, an updated reengagement score associated with the notification data for the second time; determining whether the updated reengagement score satisfies the updated reengagement score threshold for the second time; if the updated reengagement score satisfies the updated reengagement score threshold for the second time, outputting, at or after the second time, the notification alert associated with the notification data; and if the updated reengagement score does not satisfy the updated reengagement score threshold for the second time, suppressing, at or after the second time, output of the notification alert associated with the notification data.

Example 3

The method of example 2, wherein determining the reengagement score and determining the updated reengagement score are each further based at least in part on lifespan information associated with the notification data, wherein the lifespan information defines a third time at which the notification data is no longer relevant, and wherein the method further comprises, if the updated reengagement score does not satisfy the updated reengagement score threshold: deleting, at the third time, the notification data from the computing device.

Example 4

The method of any of examples 1-3, wherein determining the reengagement score is further based at least in part on one or more of a frequency the computing device accesses an application associated with the notification data, an application type of the application associated with the notification data, a notification type of the notification data, and lifespan information associated with the notification data.

Example 5

The method of any of examples 1-4, wherein suppressing the output of the notification alert comprises one of: outputting the notification alert at a reduced intensity level less than a normal intensity level for the notification alert if the reengagement score did satisfy the reengagement score threshold, or refraining from outputting the notification alert.

Example 6

The method of any of examples 1-5, wherein suppressing the output of the notification alert comprises.

Example 7

The method of any of examples 1-6, wherein the contextual information further comprises one of activity information received from a second computing device or application data associated with an application executing on the computing device.

Example 8

The method of any of examples 1-7, wherein the notification data comprises one of the reengagement type notification data or an informational type notification data, wherein the reengagement type notification data comprises notification data output by an application when the user has not interacted with the application for a threshold amount of time, and wherein the informational type notification data comprises notification data output by the application in response to a status change within the application.

Example 9

The method of any of examples 1-8, wherein determining the reengagement score is further based on a reengagement score model associated with an application associated with the notification data, wherein the method further comprises, responsive to outputting the notification alert at or after the first time: determining whether the computing device has received an indication of user input indicative of an interaction with the notification alert; if the computing device has received the indication of user input, updating the reengagement score model to indicate a positive result given the contextual information associated with the computing device at the first time; and if the computing device has not received the indication of user input, updating the reengagement score model to indicate a negative result given the contextual information associated with the computing device at the first time.

Example 10

The method of any of examples 1-9, wherein determining the reengagement score is further based on a crowdsourced reengagement score model associated with an application associated with the notification data.

Example 11

A computing device comprising: at least one processor; and a memory that stores instructions that, when executed, cause the at least one processor to: determine whether notification data received by the computing device is reengagement type notification data; if the notification data is not reengagement type notification data, output a notification alert associated with the notification data; and if the notification data is reengagement type notification data: determine, based at least in part on contextual information that is indicative of whether a user of the computing device is likely to engage with reengagement type notification data at a first time, a reengagement score threshold for the first time; determine, based at least in part on the notification data, a reengagement score associated with the notification data for the first time; determine whether the reengagement score satisfies the reengagement score threshold for the first time; if the reengagement score satisfies the reengagement score threshold for the first time, output, at or after the first time, the notification alert associated with the notification data; and if the reengagement score does not satisfy the reengagement score threshold for the first time, suppress, at or after the first time, output of the notification alert associated with the notification data.

Example 12

The computing device of example 11, wherein the instructions, when executed, further cause the at least one processor to: if the reengagement score does not satisfy the reengagement score threshold for the first time: determine, based at least in part on contextual information that is indicative of whether a user of the computing device is likely to engage with reengagement type notification data at a second time later than the first time, an updated reengagement score threshold for the second time; determine, based at least in part on the notification data, an updated reengagement score associated with the notification data for the second time; determine whether the updated reengagement score satisfies the updated reengagement score threshold for the second time; if the updated reengagement score satisfies the updated reengagement score threshold for the second time, output, at or after the second time, the notification alert associated with the notification data; and if the updated reengagement score does not satisfy the updated reengagement score threshold for the second time, suppress, at or after the second time, output of the notification alert associated with the notification data.

Example 13

The computing device of example 12, wherein the instructions that cause the at least one processor to determine the reengagement score and determine the updated reengagement score further comprise instructions that cause the at least one processor to determine the reengagement score and determine the updated reengagement score based at least in part on lifespan information associated with the notification data, wherein the lifespan information defines a third time at which the notification data is no longer relevant, and wherein the instructions, when executed, further cause the at least one processor to, if the updated reengagement score does not satisfy the updated reengagement score threshold: delete, at the third time, the notification data from the computing device.

Example 14

The computing device of any of examples 11-13, wherein the instructions that cause the at least one processor to determine the reengagement score further comprise instructions that cause the at least one processor to determine the reengagement score based at least in part on one or more of a frequency the computing device accesses an application associated with the notification data, an application type of the application associated with the notification data, a notification type of the notification data, and lifespan information associated with the notification data.

Example 15

The computing device of any of examples 11-14, wherein the instructions that cause the at least one processor to suppress the output of the notification alert comprise instructions that cause the at least one processor to either: output the notification alert at a reduced intensity level less than a normal intensity level for the notification alert if the reengagement score did satisfy the reengagement score threshold, or refrain from outputting the notification alert.

Example 16

The computing device of any of examples 11-15, wherein the contextual information that is indicative of whether the user of the computing device is likely to engage with reengagement type notification data at the first time comprises contextual information that is indicative of whether the user of the computing device is likely to engage with the notification data.

Example 17

The computing device of any of examples 11-16, wherein the notification data comprises one of the reengagement type notification data or an informational type notification data, wherein the reengagement type notification data comprises notification data output by an application when the user has not interacted with the application for a threshold amount of time, and wherein the informational type notification data comprises notification data output by the application in response to a status change within the application.

Example 18

The computing device of any of examples 11-17, wherein the instructions that cause the at least one processor to determine the reengagement score further comprise instructions that cause the at least one processor to determine the reengagement score based at least in part on a reengagement score model associated with an application associated with the notification data, wherein the instructions, when executed, further cause the at least one processor to, responsive to outputting the notification alert at or after the first time: determine whether the computing device has received an indication of user input indicative of an interaction with the notification alert; if the computing device has received the indication of user input, update the reengagement score model to indicate a positive result given the contextual information associated with the computing device at the first time; and if the computing device has not received the indication of user input, update the reengagement score model to indicate a negative result given the contextual information associated with the computing device at the first time.

Example 19

The computing device of any of examples 11-18, wherein the instructions that cause the at least one processor to determine the reengagement score further comprise instructions that cause the at least one processor to determine the reengagement score based at least in part on a crowdsourced reengagement score model associated with an application associated with the notification data.

Example 20

A non-transitory computer-readable storage medium storing instructions that, when executed, cause at least one processor of a computing device to: determine whether notification data received by the computing device is reengagement type notification data; if the notification data is not reengagement type notification data, output a notification alert associated with the notification data; and if the notification data is reengagement type notification data: determine, based at least in part on contextual information that is indicative of whether a user of the computing device is likely to engage with reengagement type notification data at a first time, a reengagement score threshold for the first time; determine, based at least in part on the notification data, a reengagement score associated with the notification data for the first time; determine whether the reengagement score satisfies the reengagement score threshold for the first time; if the reengagement score satisfies the reengagement score threshold for the first time, output, at or after the first time, the notification alert associated with the notification data; and if the reengagement score does not satisfy the reengagement score threshold for the first time, suppress, at or after the first time, output of the notification alert associated with the notification data.

Example 21

A computing device configured to perform any of the methods of examples 1-10.

Example 22

A computing device comprising means for performing any of the methods of examples 1-10.

Example 23

A computer-readable storage medium encoded with instructions for causing one or more programmable processors to perform any of the methods or examples 1-10.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A method comprising:
determining whether notification data received by a computing device is reengagement type notification data, wherein the reengagement type notification data comprises data that is output by an application in an attempt to reengage a user who has not interacted with the application for a particular amount of time;
determining that the notification data is the reengagement type notification data;
determining current contextual information that is indicative of whether the user is likely to engage with the reengagement type notification data at a first time, wherein the first time comprises at least one point in time;
determining, based at least in part on the current contextual information, a reengagement score threshold associated with the first time;
determining, based at least in part on the notification data and on a reengagement score model associated with the application, a reengagement score associated with the first time;
determining whether the reengagement score satisfies the reengagement score threshold;
if the reengagement score satisfies the reengagement score threshold, outputting, at or after the first time, and at a first intensity level, the notification alert associated with the notification data;
if the reengagement score does not satisfy the reengagement score threshold, outputting, at or after the first time, and at a second intensity level that is less than the first intensity level, the notification alert associated with the notification data; and
responsive to outputting the notification alert and determining whether the computing device has received an indication of user input indicative of an interaction with the notification alert:
 if the computing device has received the indication of user input, updating the reengagement score model to indicate a positive result given the current contextual information at the first time; and
 if the computing device has not received the indication of user input, updating the reengagement score model to indicate a negative result given the current contextual information at the first time.

2. The method of claim 1, further comprising:
if the reengagement score does not satisfy the reengagement score threshold:
 determining, based at least in part on second contextual information that is indicative of whether the user of the computing device is likely to engage with the reengagement type notification data at a second time later than the first time, an updated reengagement score threshold associated with the second time;
 determining, based at least in part on the notification data, an updated reengagement score associated the second time;
 determining whether the updated reengagement score satisfies the updated reengagement score threshold;
 if the updated reengagement score satisfies the updated reengagement score threshold, outputting, at or after the second time, and for display, the notification alert associated with the notification data; and
 if the updated reengagement score does not satisfy the updated reengagement score threshold, suppressing, at or after the second time, output of the notification alert associated with the notification data.

3. The method of claim 2, wherein determining the reengagement score and determining the updated reengagement score are each further based at least in part on lifespan information associated with the notification data, wherein the lifespan information defines a third time at which the notification data is no longer relevant, and wherein the method further comprises, if the updated reengagement score does not satisfy the updated reengagement score threshold:
deleting, at or after the third time, the notification data from the computing device.

4. The method of claim 1, wherein determining the reengagement score is further based at least in part on one or more of a frequency the computing device accesses the application associated with the notification data, an application type of the application associated with the notification data, a notification type of the notification data, or lifespan information associated with the notification data.

5. The method of claim 1, wherein the current contextual information that is indicative of whether the user of the computing device is likely to engage with the reengagement type notification data at the first time comprises contextual information that is indicative of whether the user of the computing device is likely to engage with the notification data.

6. The method of claim 1, wherein the current contextual information further comprises one of activity information received from a second computing device or application data associated with a particular application executing on the computing device.

7. The method of claim 1, wherein determining the reengagement score is further based at least in part on a crowdsourced reengagement score model associated with the application.

8. A computing device comprising:
at least one processor; and
a memory storing instructions that, when executed, cause the at least one processor to:
 determine whether notification data received by the computing device is reengagement type notification data, wherein the reengagement type notification data comprises data that is output by an application in an attempt to reengage a user who has not interacted with the application for a particular amount of time;
 determine that the notification data is the reengagement type notification data;
 determine current contextual information that is indicative of whether the user is likely to engage with the reengagement type notification data at a first time, wherein the first time comprises at least one point in time;
 determine, based at least in part on the current contextual information, a reengagement score threshold associated with the first time;
 determine, based at least in part on the notification data and on a reengagement score model associated with the application, a reengagement score associated with the first time;
 determine whether the reengagement score satisfies the reengagement score threshold;
 if the reengagement score satisfies the reengagement score threshold, output, at or after the first time, and at a first intensity level, the notification alert associated with the notification data;
 if the reengagement score does not satisfy the reengagement score threshold, output, at or after the first time, and at a second intensity level that is less than the first intensity level, the notification alert associated with the notification data; and responsive to outputting the notification alert and determining whether the computing device has received an indication of user input indicative of an interaction with the notification alert:

if the computing device has received the indication of user input, update the reengagement score model to indicate a positive result given the current contextual information at the first time; and if the computing device has not received the indication of user input, update the reengagement score model to indicate a negative result given the current contextual information at the first time.

9. The computing device of claim 8, wherein the instructions, when executed, further cause the at least one processor to:

if the reengagement score does not satisfy the reengagement score threshold:

determine, based at least in part on contextual information that is indicative of whether the user of the computing device is likely to engage with the reengagement type notification data at a second time later than the first time, an updated reengagement score threshold associated with the second time;

determine, based at least in part on the notification data, an updated reengagement score associated with the second time;

determine whether the updated reengagement score satisfies the updated reengagement score threshold;

if the updated reengagement score satisfies the updated reengagement score threshold, output, at or after the second time, and for display, the notification alert associated with the notification data; and if the updated reengagement score does not satisfy the updated reengagement score threshold, suppress, at or after the second time, output of the notification alert associated with the notification data.

10. The computing device of claim 9, wherein the instructions that cause the at least one processor to determine the reengagement score and determine the updated reengagement score further comprise instructions that cause the at least one processor to determine the reengagement score and determine the updated reengagement score based at least in part on lifespan information associated with the notification data, wherein the lifespan information defines a third time at which the notification data is no longer relevant, and wherein the instructions, when executed, further cause the at least one processor to, if the updated reengagement score does not satisfy the updated reengagement score threshold:

delete, at or after the third time, the notification data from the computing device.

11. The computing device of claim 8, wherein the instructions that cause the at least one processor to determine the reengagement score further comprise instructions that cause the at least one processor to determine the reengagement score based at least in part on one or more of a frequency the computing device accesses the application associated with the notification data, an application type of the application associated with the notification data, a notification type of the notification data, or lifespan information associated with the notification data.

12. The computing device of claim 8, wherein the current contextual information that is indicative of whether the user of the computing device is likely to engage with the reengagement type notification data at the first time comprises contextual information that is indicative of whether the user of the computing device is likely to engage with the notification data.

13. The computing device of claim 8, wherein the instructions that cause the at least one processor to determine the reengagement score further comprise instructions that cause the at least one processor to determine the reengagement score based at least in part on a crowdsourced reengagement score model associated with the application.

14. A non-transitory computer-readable storage medium storing instructions that, when executed, cause at least one processor of a computing device to:

determine whether notification data received by the computing device is reengagement type notification data, wherein the reengagement type notification data comprises data that is output by an application in an attempt to reengage a user who has not interacted with the application for a particular amount of time;

determine that the notification data is the reengagement type notification data;

determine current contextual information that is indicative of whether the user is likely to engage with the reengagement type notification data at a first time, wherein the first time comprises at least one point in time;

determine, based at least in part on the current contextual information, a reengagement score threshold associated with the first time;

determine, based at least in part on the notification data and on a reengagement score model associated with the application, a reengagement score associated with the first time;

determine whether the reengagement score satisfies the reengagement score threshold;

if the reengagement score satisfies the reengagement score threshold, output, at or after the first time, and at a first intensity level, the notification alert associated with the notification data;

if the reengagement score does not satisfy the reengagement score threshold, output, at or after the first time, and at a second intensity level that is less than the first intensity level, the notification alert associated with the notification data; and responsive to outputting the notification alert and determining whether the computing device has received an indication of user input indicative of an interaction with the notification alert:

if the computing device has received the indication of user input, update the reengagement score model to indicate a positive result given the current contextual information at the first time; and if the computing device has not received the indication of user input, update the reengagement score model to indicate a negative result given the current contextual information at the first time.

15. The method of claim 1, wherein the notification alert associated with the notification data comprises one of an audible alert, a visual alert, or a haptic alert, and wherein the second intensity level comprises one of a decreased volume, a smaller size, or a decreased vibration intensity relative to the first intensity level.

* * * * *